United States Patent
Suzuki et al.

(10) Patent No.: US 6,535,558 B1
(45) Date of Patent: *Mar. 18, 2003

(54) PICTURE SIGNAL ENCODING METHOD AND APPARATUS, PICTURE SIGNAL DECODING METHOD AND APPARATUS AND RECORDING MEDIUM

(75) Inventors: Teruhiko Suzuki, Chiba (JP); Yoichi Yagasaki, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,666

(22) Filed: Jan. 23, 1998

(30) Foreign Application Priority Data

Jan. 24, 1997 (JP) ................................. 9-011635

(51) Int. Cl.[7] ................................. H04B 1/66
(52) U.S. Cl. ................................. 375/240.12
(58) Field of Search ................................. 348/397, 400, 348/404, 408, 409, 411; 382/240, 248, 251; 386/111; 375/240.12

(56) References Cited

U.S. PATENT DOCUMENTS

| | | | | |
|---|---|---|---|---|
| 5,412,428 A | * | 5/1995 | Tahara | 348/397 |
| 5,479,264 A | * | 12/1995 | Ueda et al. | 386/111 |
| 5,574,503 A | * | 11/1996 | May | 375/240.12 |
| 5,768,438 A | * | 6/1998 | Etoh | 382/251 |

* cited by examiner

Primary Examiner—Chris Kelley
Assistant Examiner—Allen Wong
(74) Attorney, Agent, or Firm—Frommer Lawrence & Haug LLP; William S. Frommer; Glenn F. Savit

(57) ABSTRACT

A picture encoder for encoding picture signals of a lower hierarchy representing pre-set picture signals and picture signals of an upper hierarchy similarly representing pre-set picture signals. The picture encoder includes a first encoding unit for encoding the picture signals of the lower hierarchy using reference picture signals for outputting first pre-set encoded data, a second encoding unit for encoding the picture signals of the upper hierarchy using reference picture signals for outputting second pre-set encoded data, a first decoding unit for decoding the first encoded data for generating first reference picture signals and a second decoding unit for decoding the second encoded data for generating second reference picture signals. The second encoding unit encodes the picture signals using third reference picture signals generated on adaptively switching between the first reference picture signals and the second reference picture signals on the pixel basis.

40 Claims, 22 Drawing Sheets

| ref_select_code | FORWARD REFERENCE PREDICTION |
|---|---|
| 00 | LATEST DECODED UPPER-ORDER VOP BELONGING TO SAME LAYER |
| 01 | LATEST VOP IN DISPLAY SEQUENCE BELONGING TO SAME LAYER |
| 10 | NEXT VOP IN DISPLAY SEQUENCE BELONGING TO REFERENCE LAYER |
| 11 | COINCIDENT VOP IN REFERENCE LAYER (NON-MOVING VECTOR) |

FIG.10

| ref_select_code | FORWARD REFERENCE PREDICTION | BACKWARD REFERENCE PREDICTION |
|---|---|---|
| 00 | LATEST DECODED UPPER-ORDER VOP BELONGING TO SAME LAYER | COINCIDENT VOP IN REFERENCE LAYER (NON-MOVING VECTOR) |
| 01 | LATEST DECODED UPPER-ORDER VOP BELONGING TO SAME LAYER | LATEST VOP IN THE DISPLAY SEQUENCE BELONGING TO REFERENCE LAYER |
| 10 | LATEST DECODED UPPER-ORDER VOP BELONGING TO SAME LAYER | NEXT VOP IN THE DISPLAY SEQUENCE BELONGING TO REFERENCE LAYER |
| 11 | LATEST VOP IN THE DISPLAY SEQUENCE BELONGING TO REFERENCE LAYER | LATEST VOP IN THE DISPLAY SEQUENCE BELONGING TO REFERENCE LAYER |

FIG.11

| First_shape_code | COD | MCBPC | | | | |
|---|---|---|---|---|---|---|
| Second_shape_code | MVD_shape | ST | VLC_binary/Vpass | RLB/ULB | | |
| AC_prep_flag | CBPY | DQUANT | MVD | MVD2 | MVD3 | MVD4 |
| CODA | Alpha_ACprep_flag | CBPA | Alpha_Block_Data | | | Block_Data |

FIG.16

| First_shape_code | MODB | MBTYPE | | |
|---|---|---|---|---|
| Second_shape_code | MVD_shape | ST | ST | VLC_binary/Vpass | RLB/ULB |
| CBPB | DQUANT | MVDf | MVDb | MVDB |
| CODA | CBPBA | Alpha_Block_Data | Block_Data | |

FIG. 17

| INDEX | CBPB | MBTYPE | NUMBER OF BITS | CODE |
|---|---|---|---|---|
| 0 | | | 1 | 0 |
| 1 | | X | 2 | 10 |
| 2 | X | X | 2 | 11 |

FIG.18

| INDEX | MBTYPE | DQUANT | MVDf | MVDb | MVDB | NUMBER OF BITS | CODE |
|---|---|---|---|---|---|---|---|
| 0 | DIRECT (H.263B) | | | | x | 1 | 1 |
| 1 | INTERPOLATED MC+Q | x | x | x | | 2 | 01 |
| 2 | BACKWARD MC+Q | x | | x | | 3 | 001 |
| 3 | FORWARD MC+Q | x | x | | | 4 | 0001 |

FIG.19

| INDEX | MBTYPE | DQUANT | MVDf | MVDb | CODE |
|---|---|---|---|---|---|
| 0 | PixelMode | x | | | 1 |
| 1 | Forward | x | x | | 01 |
| 2 | Interpolate | x | x | x | 001 |
| 3 | Backward | x | | x | 0001 |

FIG. 20

PICTURE SIGNAL ENCODING METHOD AND APPARATUS, PICTURE SIGNAL DECODING METHOD AND APPARATUS AND RECORDING MEDIUM

BACKGROUND OF THE INVENTION

1. Field of the invention

This invention relates to a picture signal encoding method and apparatus, a picture signal decoding method and apparatus and a recording medium, which can be applied with advantage to recording moving picture signals on, for example, a recording medium, such as a magneto-optical disc or a magnetic tape for later reproduction on a display device, transmitting moving picture signals from a transmitting side over a transmission channel for reception and display on the receiving side, as in a teleconferencing system, television telephone system, broadcast equipment or in a multi-media data base retrieval system, or to editing and recording moving picture signals.

2. Description of Related Art

In a system for transmitting moving picture signals to a remote site, such as a teleconferencing system or a television telephone system, the picture signals are compressed by encoding by taking advantage of line-to-line correlation or frame-to-frame correlation.

Among illustrative high efficiency encoding systems for moving picture signals is a so-called MPEG system, which is a system for encoding moving picture signals for storage. This system, discussed by ISO-IEC/JTC1/SC2/WG11 and proposed as a standard draft, employs a hybrid system which is the combination of the motion compensation predictive coding and discrete cosine transform (DCT). In MPEG, a number of profiles and levels are defined for coping with various applications and functions. The most basic is the main profile main level (MP@ML).

Referring to FIG. 21, an illustrative structure of an encoder of MP@ML of the MPEG system is explained.

An input picture signal is first entered to a frame memory 201 from which it is subsequently read out and sent to a downstream side circuitry for encoding in a pre-set sequence.

Specifically, picture signals to be encoded are read out on the macro-block basis from a frame memory 201 so as to be entered to a motion vector detection circuit 202 (ME). The motion vector detection circuit 202 processes the picture data of the respective frames as I-, P- or B-pictures, in accordance with a pre-set sequence. It is predetermined by which of the I-, P- or B-pictures the pictures of sequentially entered respective frames are processed. For example, the sequentially entered pictures are processed in the sequence of I, B, P, B, P, ..., B P.

The motion vector detection circuit 202 refers to a pre-set reference frame to do motion compensation to detect the motion vector. There are three modes for motion compensation (inter-frame prediction), that is forward prediction, backward prediction and bi-directional prediction. The prediction mode for the P-picture is solely the forward prediction, while there are three prediction modes for the B-picture, that is, forward prediction, backward prediction and bi-directional prediction. The motion vector detection circuit 202 selects the prediction mode which minimizes prediction errors and generates the motion vector for the selected mode.

The prediction errors are compared to, for example, the variance values of the macro-block being encoded. If the variance value of the macro-block is smaller, prediction is not executed for the macro-block. Instead, the intra-frame encoding is executed. In this case, the prediction mode is the intra-frame encoding. The information of the motion vector and the prediction mode is entered to a variable length encoding circuit 206 and to a motion compensation circuit 212 (MC circuit).

The motion compensation circuit 212 generates prediction reference picture signals, based on the pre-set motion vector, and sends the prediction reference picture signals to an arithmetic unit 203. The arithmetic unit 203 finds a difference between the value of the picture signals for encoding, supplied from the frame memory 201, and the value of the prediction reference picture signals from the motion compensation circuit 212 for each macro-block, and outputs a difference signal to a DCT circuit 204. In case of the intra-macro-block (macro-block encoded by intra-picture coding), the arithmetic unit 203 directly outputs the macro-block of the picture signals for encoding to the DCT circuit 204.

The DCT circuit 204 processes the difference signals from the arithmetic unit 203 or the picture signals per se with DCT for conversion into DCT coefficients. These DCT coefficients are entered to a quantization circuit 205 so as to be quantized with a quantization step in meeting with the stored data volume in a transmission buffer 207 (residual data volume that can be stored in a buffer) and so as to be entered as quantized data to the variable length encoding circuit 206.

The variable length encoding circuit 206 converts the quantized data supplied from the quantization circuit 205, in accordance with the quantization step (quantization scale) supplied from the quantization circuit 205 into, for example, variable length codes, such as Huffman codes, for outputting the encoded data to the transmission buffer 207.

The variable length encoding circuit 206 is also fed with the quantization step (quantization scale) from the quantization circuit 205, the prediction mode (prediction mode indicating which of the intra-picture prediction, forward prediction, backward prediction or bi-directional prediction has been set) from the motion vector detection circuit 202, and with the motion vector, so as to be encoded with VLC.

The transmission buffer 207 transiently stores the input data and outputs to the quantization circuit 205 data corresponding to the stored data volume as quantization control signals by way of performing buffer feedback. That is, when the data volume stored in the transmission buffer 207 (the residual data volume that can be stored therein) is increased to a theoretical upper limit value, the buffer 207 causes the quantization scale of the quantization circuit 205 to be increased by the quantization control signal to lower the data volume of the quantized data outputted by the quantization circuit 205. Conversely, should the stored data volume (residual data volume that can be stored) be decreased to an allowable lower limit value, the transmission buffer 207 reduces the quantization scale of the quantization circuit 205 by the quantization control signal to increase the data volume of the quantized data outputted by the quantization circuit 205. This prevents overflow or underflow of the transmission buffer 207 from occurring.

The encoded data stored in the transmission buffer 207 is read out at a pre-set timing so as to be outputted as a bitstream on the transmission channel.

The quantized data outputted by the quantization circuit 205 is also entered to an inverse quantization circuit (IQ) 208. This inverse quantization circuit 208 inverse-quantizes the quantized data supplied from the quantization circuit 205 in accordance with the quantization step similarly supplied from the quantization circuit 205. An output signal of the inverse quantization circuit 208 (DCT coefficients obtained on inverse quantization) are entered to an IDCT circuit 209, an inverse-quantized output signal of which is sent to an arithmetic unit 210. If an output signal of the IDCT circuit 209 is a difference signal, the arithmetic unit 210 sums the difference signal from the IDCT circuit 209 to the picture signals from the motion compensation circuit 212 for restoring the picture signals which are then stored in a frame memory 211. Meanwhile, if the output signal of the IDCT circuit 209 is an intra-macro-block, the output signals of the IDCT circuit 209 (picture signals) are directly outputted. The motion compensation circuit 212 generates prediction reference picture signals using the picture of the frame memory 211, motion vector and the prediction mode.

Referring to FIG. 22, an illustrative structure of the MP@ML decoder of MPEG is explained.

The encoded picture data transmitted over a transmission channel (bitstream) is received by a reception circuit, not shown, or reproduced by a reproducing device so as to be transiently stored in a reception buffer 221 and so as to be supplied as encoded data to a variable-length decoding circuit 222 as encoded data. The variable-length decoding circuit 222 variable-length decodes the encoded data supplied from the reception buffer 221 to output the resulting motion vector and prediction mode to a motion compensation circuit 227 while outputting the quantization step to an inverse quantization circuit 223 and outputting the variable-length decoded data (quantized data) to the inverse quantization circuit 223.

The inverse quantization circuit 223 inverse-quantizes data supplied from the variable-length decoding circuit 222 in accordance with the quantization step supplied similarly from the variable-length decoding circuit 222 to output the resulting DCT coefficients to an IDCT circuit 224. The DCT coefficients, outputted by the inverse quantization circuit 223, are inverse DCTed by the IDCT circuit 224, an output signal of which (picture signal or the difference signal) is sent to an arithmetic unit 225.

If the output data from the IDCT circuit 224 is an I-picture signal, the picture signal is directly outputted by the arithmetic unit 225 so as to be sent to and stored in a frame memory 226 for generation of the prediction reference picture for the reference signal subsequently entered to this arithmetic unit 225 (data of the P- or B-picture). The picture signals from this arithmetic unit 225 are directly outputted to outside as a playback picture.

If the input bitstream is a P- or B-picture, the motion compensation circuit 227 generates prediction reference picture signals in accordance with the prediction mode and the motion vector supplied from the variable-length decoding circuit 222 to output the prediction reference picture signals to the arithmetic unit 225. The arithmetic unit 225 sums the difference picture signal supplied from the IDCT circuit 224 and the prediction reference picture signals supplied from the motion compensation circuit 227 to output the resulting sum signal as a playback picture. If the input bitstream is a P-picture, the picture signals from the arithmetic unit 225 are entered to and stored in the frame memory 226 so as to be used as a reference picture for the next-decoded picture signals.

In MPEG, a variety of profiles and levels are defined in addition to MP@ML and a variety of tools are also readied. One of such tools of MPEG is scalability as now explained.

In MPEG, a scalable encoding system, designed to implement scalability in keeping with the different picture size or the different frame rate, is introduced. If, in case of spatial scalability, only the bitstream of the lower layer is decoded, picture signals of small picture size are decoded. On the other hand, if the bitstreams of the lower layer and the upper layer are decoded, picture signals of large picture size are decoded.

Referring to FIG. 23, a spatial scalability encoder is explained. In the case of the spatial scalability, the lower layer and the upper layer correspond to picture signals of the small picture size and to those of the large picture size, respectively.

The picture signals of the lower layer are first entered to a frame memory 261 so as to be encoded by the downstream side circuitry in the same manner as the above-mentioned MP@ML.

That is, data read out on the macro-block basis from the frame memory 261 are entered to a motion vector detection circuit 262. The motion vector detection circuit 262 processes picture data of the respective frames as I-, P- or B-pictures in accordance with a pre-set sequence.

The motion vector detection circuit 262 refers to a pre-set reference frame (that is, forward original picture, backward original picture or an original picture) to perform motion compensation to detect the motion vector. There are three sorts of the prediction mode, that is the forward prediction, backward prediction and bi-directional prediction. The motion vector detection circuit 262 selects the prediction mode which minimizes the prediction errors and generates the corresponding motion vector. The information on the prediction mode and the motion vector is entered to a variable length encoding circuit 266 and to a motion compensation circuit 272.

The motion compensation circuit 272 generates prediction reference picture signals, based on a pre-set motion vector, to supply the prediction reference picture signals to an arithmetic unit 263. The arithmetic unit 263 finds a difference signal between the value of picture signals for encoding from the frame memory 261 and the values of a macro-block of the prediction reference picture signals from the motion compensation circuit 272 for each macro-block to output the difference signal to a DCT circuit 264. If the macro-block is an intra-macro-block, that is an intra-picture coded macro-block, the arithmetic unit 263 directly outputs the signals of the encoded macro-block to the DCT circuit 264.

The DCT circuit 264 processes the difference signals from the arithmetic unit 263 with DCT for converting the difference signals into DCT coefficients. These DCT coefficients are entered to a quantization circuit 265 for quantization in accordance with the quantization step in keeping with the stored data quantity in the transmission buffer 267 (residual data volume that can be stored in the buffer) so as to be entered as quantized data to the variable length encoding circuit 266.

The variable length encoding circuit 266 converts the quantized data supplied from the quantization circuit 265 for quantization in accordance with the quantization step (quantization scale) supplied from the quantization circuit 265 into variable-length codes, such as Huffman codes, for outputting the encoded data to the transmission buffer 267.

The variable length encoding circuit 266 is also fed with the quantization step (quantization scale) from the quantization circuit 265 and with the prediction mode from the motion vector detection circuit 262 (prediction mode indicating which of the intra-picture prediction, forward prediction, backward prediction or bi-directional prediction has been set). These data are similarly encoded by VLC.

The transmission buffer 267 transiently stores the encoded input data and outputs data corresponding to the stored data volume as a quantization control signal to the quantization circuit 265 by way of buffer feedback. This prevents overflow or underflow in the transmission buffer 267 from occurring.

The encoded data stored in the transmission buffer 267 is read out at a pre-set timing so as to be outputted as a bitstream to the transmission channel.

The encoded data outputted from the quantization circuit 265 are also entered to an inverse quantization circuit 268 which then inverse-quantizes the quantized data from the quantization circuit 265 in accordance with the quantization step similarly supplied from the quantization circuit 265. An output signal (DCT coefficients) of the inverse quantization circuit 268 is entered to an IDCT circuit 269 for inverse quantization. An output signal (picture signal or difference signal) is sent to an arithmetic unit 270. If the output signal of the IDCT circuit 269 is the P-picture difference signal, the arithmetic unit 270 sums the difference signal from the IDCT circuit 269 to the picture signal from the motion compensation circuit 272 for restoration of the picture signals. If the output signal of the IDCT circuit 269 is the intra-coded macro-block, the picture signals from the IDCT circuit 269 are outputted directly. These picture signals are stored in a frame memory 271. The motion compensation circuit 272 generates prediction reference picture signals using the picture signals of the frame memory 272, motion vector and the prediction mode.

It is noted that, in this illustrative structure of the lower layer, an output image signal of an arithmetic unit 270 is not only supplied to the frame memory 271 so as to be used as a reference picture of the lower layer, but is enlarged to the same image size as the image size of the upper layer by the picture enlarging circuit 243, adapted for enlarging the picture by up-sampling, so as to be used also as a reference picture of the upper layer.

That is, the picture signals from the arithmetic unit 270 are entered to the frame memory 271 and to the picture enlarging circuit 243, as described above. The picture enlarging circuit 243 enlarges the picture signals generated by the arithmetic unit 270 to the same size as the picture size of the upper layer in order to output the enlarged picture signals to a weighting addition circuit 244.

The weighting addition circuit 244 multiplies the output signal from the picture enlarging circuit 243 with a weight (1-W) to output the resulting multiplied signal to an arithmetic unit 258.

On the other hand, the picture signals of the upper layer are first supplied to the frame memory 245. As in the case of the MP@ML, a motion vector detection circuit 246 sets the motion vector and the prediction mode.

In the above-described structure of the upper layer, the motion compensation circuit 256 generates prediction reference picture signals in accordance with the motion vector and the prediction mode set by the motion vector detection circuit 246. These prediction reference picture signals are sent to a weighting addition circuit 257 which then multiplies the prediction reference picture signals with a weight W (weighting coefficients W) to output the resulting product signals to the arithmetic unit 258.

The arithmetic unit 258 sums the picture signals of the weighting addition circuits 244, 257 to output the resulting picture signals as the prediction reference picture signals to the arithmetic unit 247. The picture signals from the arithmetic unit 258 are also supplied to an arithmetic unit 254 so as to be summed to the picture signals from the inverse DCT circuit 253. The resulting sum signal is supplied to a frame memory 255 so as to be used as reference picture signals for the picture signals encoded next time.

The arithmetic unit 247 calculates the difference between the picture signals from the frame memory 245 and the prediction reference picture signals from the arithmetic unit 258 to output the resulting difference signals. If the macro-block is the intra-frame coded macro-block, the arithmetic unit 247 directly outputs the picture signals to the DCT circuit 248.

The DCT circuit 248 processes the output signal of the arithmetic unit 247 with discrete cosine transform (DCT) to generate DCT coefficients which are outputted to a quantization circuit 249. As in the case of the MP@ML, the quantization circuit 249 quantizes the DCT coefficients in accordance with the quantization scale as set on the basis of the data storage volume of the transmission buffer 251 to output the quantized DCT coefficients as quantized data to a variable length encoding circuit 250, which then variable-length encodes the quantized data to output the encoded data via transmission buffer 251 as a bitstream of the upper layer.

The quantized data from the quantization circuit 249 also is inverse-quantized by an inverse quantization circuit 252 using the quantization scale used in the quantization circuit 249. An output data (DCT coefficients) of the inverse quantization circuit 252 is sent to an inverse DCT circuit 253. The inverse DCT circuit 253 processes the DCT coefficients with DCT so that an output signal (picture signal or difference signal) is sent to the arithmetic unit 254. If the output signal of the inverse DCT circuit 253 is the difference signal of a P-picture, the arithmetic unit 254 sums the picture signals from the arithmetic unit 258 to the difference signal from the inverse DCT circuit 253 for restoration of the picture signals. If the output signal of the inverse DCT circuit 253 is the intra-coded macro-block, the picture signals are directly outputted from the inverse DCT circuit 253. These picture signals are recorded in the frame memory 255. A motion compensation circuit 256 generates prediction reference picture signals, using picture signals from the frame memory 255, motion vector and prediction mode.

The variable length encoding circuit 20 also is fed with the prediction mode and the motion vector, detected by the motion vector detection circuit 246, the quantization scale used in the quantization circuit 249 and with the weight W used in the weighting addition circuits 244, 257. These are encoded and transmitted.

Referring to FIG. 24, an illustrative decoder of spatial scalability is explained.

The bitstream of the lower layer is entered to a reception buffer 301 so as to be subsequently decoded as in the case of the MP@ML. That is, the encoded data read out from the reception buffer 301 are sent to the variable length decoding circuit 302. The variable length decoding circuit 302 variable-length decodes the encoded data supplied from the reception buffer 301 to output the motion vector and the prediction mode to a motion compensation circuit 307, as well as to output the quantization step and the variable-decoded data (quantized data) to an inverse quantization circuit 303 on the macro-block basis.

The inverse quantization circuit 303 inverse-quantizes the data (quantized data) supplied from the variable length decoding circuit 302 in accordance with the quantization step similarly supplied from the variable length decoding circuit 302. The resulting inverse-quantized data (DCT coefficients) are outputted to an IDCT circuit 304. The DCT coefficients, outputted by the inverse quantization circuit 303, are inverse DCTed by the IDCT circuit 304 to send an output signal (picture signal or the difference signal) to the arithmetic unit 305.

If the output signal from the IDCT circuit 304 is the I-picture data, the picture signals, these signals are directly outputted from the arithmetic unit 305 and supplied to the frame memory 306 for storage therein for generating prediction reference picture signals of the difference signals subsequently entered to the arithmetic unit 305. The picture signals are also directly outputted to outside as a playback picture.

On the other hand, if the input bitstream is the P- or B-picture, the motion compensation circuit 307 generates prediction reference picture signals, in accordance with the prediction mode and the motion vector supplied from the variable-length decoding circuit 302, and outputs the prediction reference picture signals to the arithmetic unit 305. The arithmetic unit 305 sums the difference signal entered from the IDCT circuit 304 and the prediction reference picture signals supplied from the motion compensation circuit 307 to output the sum as picture signals. If the input bitstream is a P-picture, the picture signals from the arithmetic unit 305 are entered to and stored in the frame memory 306 so as to be used as prediction reference picture signals for the next-decoded picture signals.

In the configuration of FIG. 24, the picture signals from the arithmetic unit 305 are not only outputted to outside and stored in the frame memory 306 so as to be used as prediction reference picture signals for the next-decoded picture signals, but also enlarged to the same picture size as the picture signals of the upper layer by a picture enlarging circuit 327 so as to be substantially used as prediction reference picture signals for the upper layer.

That is, the picture signals from the arithmetic unit 305 are outputted as playback picture signals of the lower layer, as described above, while being outputted to the frame memory 306 and supplied to the picture enlarging circuit 327. The picture enlarging circuit 327 enlarges the picture signals to the same size as the picture size of the upper layer in order to output the enlarged picture signals to a weighting addition circuit 328.

The weighting addition circuit 328 multiplies the picture signal from the picture enlarging circuit 327 with a weight (1-W) to output the resulting multiplied signal to an arithmetic unit 317. The value (1-W) is derived from the decoded weight W.

The bitstream of the upper layer is supplied via reception buffer 309 to variable-length decoding circuit 310 where encoded data are decoded, that is, the quantization scale, motion vector, prediction mode and the weighting coefficients are decoded, as are the quantized data. The quantized data, variable-length decoded by the variable-length decoding circuit 310, are inverse-quantized by an inverse quantization circuit 311, using the similarly decoded quantization scale, so as to be outputted as DCT coefficients to an inverse DCT circuit 312, which then processes the DCT coefficients with IDCT to output an output signal (picture signal or difference signal) to an arithmetic unit 313.

A motion compensation circuit 315 generates prediction reference picture signals in accordance with the decoded motion vector and prediction mode to enter the prediction reference picture signals to a weighting addition circuit 316, which then multiplies the prediction reference picture signals from the motion compensation circuit 315 with the decoded weight W. The resulting product, obtained by this multiplication, is outputted to the arithmetic unit 317.

The arithmetic unit 317 sums the picture signals of the weighting addition circuits 328 and 316 to output the resulting picture signals to the arithmetic unit 313. If the output signal from the IDCT circuit 312 is the difference signal, the arithmetic unit 313 sums the difference signal of the IDCT circuit 312 to the picture signals from the arithmetic unit 317 for restoration of the picture signals of the upper layer. If the output signal of the IDCT circuit 312 is the intra-coded macro-block, the picture signals from the IDCT circuit 312 are directly outputted. These picture signals are stored in the frame memory 314 so as to be used as a prediction reference picture for the subsequently decoded picture signals.

Although the foregoing description is made of processing of luminance signals, processing of chroma signals is similar to that for the luminance signals. It is noted however that, in this case, the motion vector which is that for luminance signals halved in both the vertical and horizontal directions is used.

Although the foregoing description is of the MPEG system, a variety of other high efficiency encoding systems for moving pictures have been standardized. For example, the ITU-I (International Telecommunication Union-Telecommunication Sector) provides the H, 261 or H. 263 system as the encoding system mainly for communication. Similarly to the MPEG system, this H. 261 or the H. 263 is basically the combination of the motion-compensated predictive coding and DCT transform coding, and uses similar encoders or decoders, despite the difference in details, such as the header information.

In MPEG2, the spatial scalability is already standardized, however, its encoding efficiency cannot be said to be optimum. Thus, with the MPEG4 system or other novel encoding systems, it is mandatory to improve the encoding efficiency for spatial scalability.

This spatial scalability in the MPEG2 system is explained in some detail. In this scalable encoding system, the lower layer is encoded as in MP@ML for the usual encoding system, that is MPEG2. The upper layer uses a picture of the lower layer at the same time point and a directly previously decoded picture of the same layer. The prediction mode for the lower layer is set completely independently of that for the upper layer. Thus, there are occasions wherein the information has been transmitted in the lower layer but is not used in the upper layer such that encoding is effectuated by prediction from the decoded picture of the upper layer. This is tantamount to independently transmitting the information which can be co-owned by the upper and lower layers.

It is therefore incumbent to reduce such redundancy in information transmission to improve the encoding efficiency.

On the other hand, the MPEG2 system cannot designate the encoding mode except on the macro-block basis. Although not objectionable when handling a picture of a generally uniform picture area, this feature of the MPEG2 system tends to lower the encoding efficiency in case of a sequence exhibiting a complex motion, or in case pictures of different properties, such as a still area and a moving area, are contained in one and the same macro-block.

OBJECT AND SUMMARY OF THE INVENTION

It is therefore an object of the present invention to provide a picture signal encoding method and apparatus, a picture signal decoding method and apparatus and a recording medium whereby it is possible to improve the prediction and encoding efficiency in the spatial scalable encoding system.

In one aspect, the present invention provides a picture encoder for encoding picture signals of a lower hierarchy representing pre-set picture signals and picture signals of an upper hierarchy similarly representing pre-set picture signals. The picture encoder includes a first encoding unit for encoding the picture signals of the lower hierarchy using reference picture signals for outputting first pre-set encoded data, a second encoding unit for encoding the picture signals of the upper hierarchy using reference picture signals for outputting second pre-set encoded data, a first decoding unit for decoding the first encoded data for generating first reference picture signals, and a second decoding unit for decoding the second encoded data for generating second reference picture signals. The second encoding unit encodes the picture signals using third reference picture signals generated on adaptively switching between the first reference picture signals and the second reference picture signals on the pixel basis.

In another aspect, the present invention provides a picture encoding method for encoding picture signals of a lower hierarchy representing pre-set picture signals and picture signals of an upper hierarchy similarly representing pre-set picture signals. The encoding method includes a first encoding step of encoding the picture signals of the lower hierarchy using reference picture signals for outputting first encoded data, a second encoding step of encoding the picture signals of the upper hierarchy using reference picture signals for outputting second encoded data, a first decoding step of decoding the first encoded data for generating first reference picture signals and a second decoding step of decoding the second encoded data for generating second reference picture signals. The second encoding unit encodes the picture signals using third reference picture signals generated on adaptively switching between the first reference picture signals and the second reference picture signals on the pixel basis.

In a further aspect, the present invention provides a picture decoding device for receiving and decoding encoded data composed of encoded picture signals of a lower hierarchy and encoded picture signals of an upper hierarchy, the encoded picture signals of the lower hierarchy and the encoded picture signals of the upper hierarchy being signals encoded using respective reference picture signals. The picture decoding device includes a receiving unit fr receiving the encoded data, a first decoding unit for decoding the encoded picture signals of the lower hierarchy using reference picture signals for outputting decoded picture signals of the lower hierarchy, with the decoded picture signals of the lower hierarchy being used as first reference picture signals, and a second decoding unit for decoding the encoded picture signals of the upper hierarchy using reference picture signals for outputting decoded picture signals of the upper hierarchy, with the decoded picture signal s of the upper hierarchy being used as second reference picture signals. The second decoding unit decodes the picture signals using third reference picture signals generated on adaptively switching between the first reference picture signals and the second reference picture signals on the pixel basis.

In further aspect, the present invention provides a picture decoding method for receiving and decoding encoded data composed of encoded picture signals of a lower hierarchy and encoded picture signals of an upper hierarchy, the encoded picture signals of the lower hierarchy and the encoded picture signals of the upper hierarchy being signals encoded using respective reference picture signals. The picture decoding method includes a receiving step of receiving the encoded data, a first decoding step of decoding the encoded picture signals of the lower hierarchy using reference picture signals for outputting decoded picture signals of the lower hierarchy, with the decoded picture signals of the lower hierarchy being used as first reference picture signals, and a second decoding step of decoding the encoded picture signals of the upper hierarchy using reference picture signals for outputting decoded picture signals of the upper hierarchy, with the decoded picture signals of the upper hierarchy being used as second reference picture signals. The second decoding step decodes the picture signals using third reference picture signals generated on adaptively switching between the first reference picture signals and the second reference picture signals on the pixel basis.

In a further aspect, the present invention provides a recording medium decodable by a picture decoding device. The recording medium contains encoded data composed of encoded picture signals of a lower hierarchy and encoded picture signals of an upper hierarchy. The encoded data is data generated by a first encoding step of encoding the picture signals of the lower hierarchy using reference picture signals for outputting first encoded data, a second encoding step of encoding the picture signals of the upper hierarchy using reference picture signals for outputting second encoded data, a first decoding step of decoding the first encoded data for generating first reference picture signals and a second decoding step of decoding the second encoded data for generating second reference picture signals. The second encoding step encodes the picture signals using third reference picture signals generated on adaptively switching between the first reference picture signals and the second reference picture signals on the pixel basis.

According to the present invention, in which picture signals are split into separate hierarchies and picture signals of the respective hierarchies are encoded using prediction reference pictures, signals obtained on encoding picture signals of the respective layers are decoded to generate reference pictures of respective layers, while pixels of the reference pictures are adaptively switched to generate reference pictures. In addition, pre-set units of the reference pictures are adaptively switched to generate pre-set reference pictures to realize a spatially scalable encoding method with improved prediction efficiency and encoding efficiency.

BRIEF DESCRIPTION OF THE DRAWINGS

FIG. 10 shows a table of flag (ref_select_code) for a P-picture.

FIG. 11 shows a table of flag (ref_select_code) for a B-picture.

FIG. 16 illustrates the syntax of a macro-block in I- and P-pictures.

FIG. 17 shows the syntax of a macro-block in a B-picture.

FIG. 18 shows a variable-length code of MODB which is a flag showing the type of a macro-block in a B-picture.

FIG. 19 shows MBTYPE which is a flag showing the type of a macro-block in a B-picture.

FIG. 20 shows MBTYPE in an upper layer.

DESCRIPTION OF PREFERRED EMBODIMENTS

Figure 1:
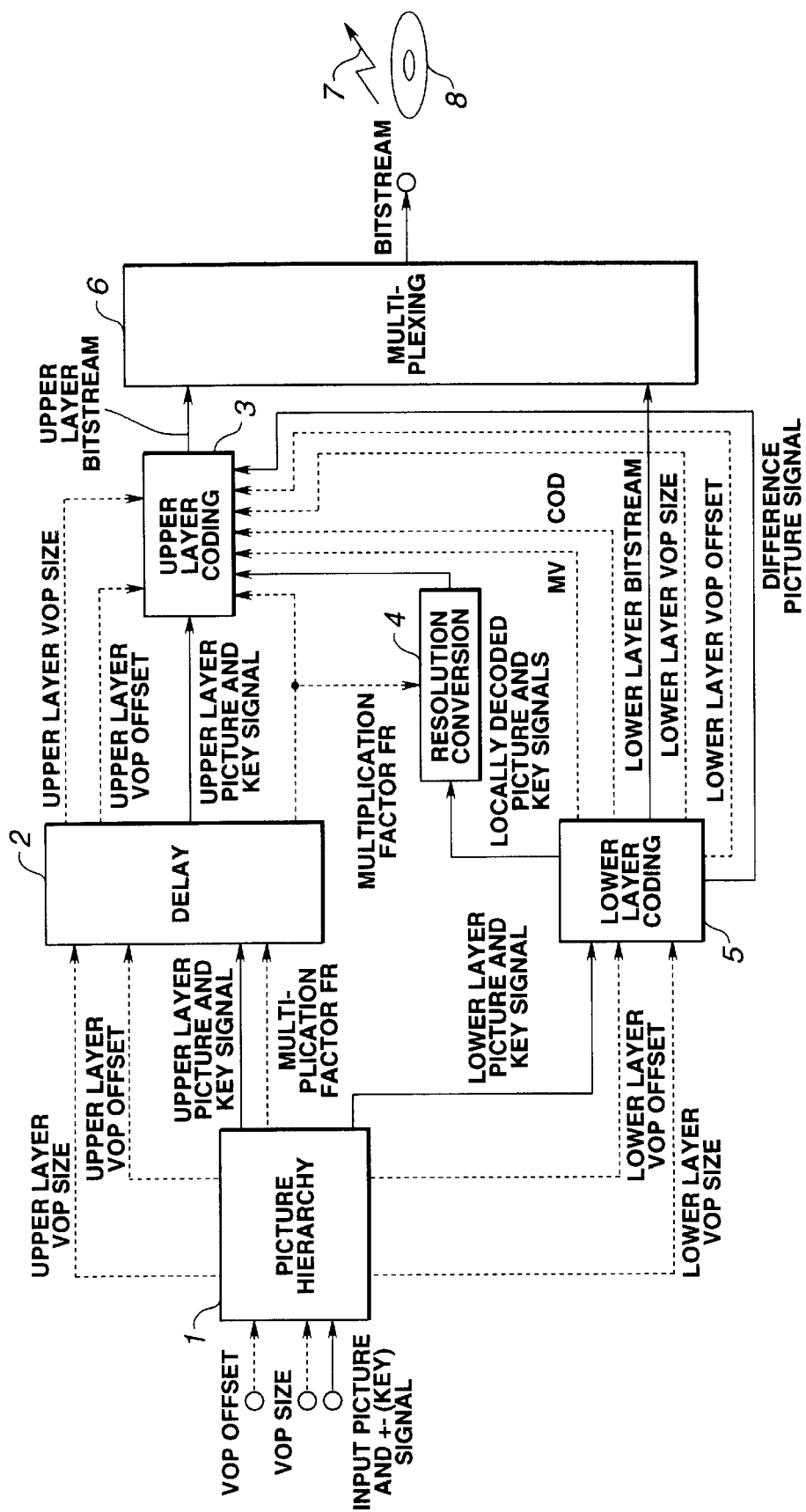
FIG. 1 is a schematic block circuit diagram showing a structure of a picture signal encoding device for carrying out the picture signal encoding method of the present invention.

Referring to the drawings, preferred embodiments of the present invention will be explained in detail.

Before proceeding to description of the preferred embodiments of the present invention, the basic concept underlying the present invention will be explained in connection with the properties of the reference pictures in MPEG.

Usually, the picture signals of the upper layer are superior in picture quality to those of the lower layer. Therefore, if the frame-to-frame variations are small, prediction errors are reduced in many cases by doing motion compensation using pictures of the upper layer. However, if the frame-to-frame variations are significant, the motion compensation efficiency is lowered, so that pictures at the same time instant are preferably used for realization of the better efficiency. In this consideration, it is preferred to use picture signals of the lower layer at the same time instant in an area having significant frame-to-frame difference and to use pictures of the same hierarchy (upper layer) in an area having small frame-to-frame difference.

Next, the overlapping of the information of the spatial scalable encoding of the MPEG system is explained.

It is assumed that a given macro-block of an upper layer is encoded. If the information (DCT coefficients) is transmitted in a macro-block of a lower layer associated with the macro-block of the upper layer, and prediction is performed by having reference to the same picture of the upper layer, the information is transmitted independently for the lower layer and the upper layer. That is, the information transmitted in the lower layer is not used in encoding the upper layer, thus lowering the efficiency. Therefore, if the DCT coefficients are transmitted in the macro-block of the associated lower layer, overlapping in data transmission becomes smaller and the efficiency becomes higher if, when transmitting the DCT coefficients in the associated macro-block of the lower layer, the picture of the lower layer is used as the prediction reference pictures.

From the foregoing, it may be said that (1) if a given macro-block of the upper layer is encoded, a picture at the same time point (picture of the lower layer) is preferably used as a reference picture in an area of a larger frame-to-frame difference and (2) if a given macro-block of an upper layer is encoded, and if DCT coefficients of the associated macro-block of the lower layer are transmitted, the picture of the lower layer is preferably used as a reference picture.

In the conventional picture signal encoding system, such as MPEG2, the prediction mode is switched on the macro-block basis. In case of a uniform picture area, this macro-block-based switching of the prediction mode is sufficient. However, if a picture exhibits complex motion, or if the picture size is small, an area where a picture is temporally changed and an area where a picture is not temporally changed co-exist in the macro-block, thus lowering the efficiency.

Therefore, if the prediction mode can be switched on the pixel basis, the result is the improved encoding efficiency.

In light of the above, reference is had in the present invention to the post-IDCT difference picture, such that, in generating a reference picture, a pixel of an upper layer is used for a pixel having the difference value less than a certain threshold value, whilst a pixel of a lower layer is used for a pixel having the difference value less than a certain threshold value. The reference picture generated at this time is such a picture n which the upper layer picture and the lower layer picture are switched on the pixel basis. In the present invention, parallel displacement (translational movement) can be coped with by switching on the pixel basis using the post-IDCT difference picture.

That is, according to the present invention, the reference picture generated on adaptive switching on the pixel basis, the picture of the lower layer following resolution conversion (following picture enhancement in the present embodiment) and the picture decoded directly before the upper layer, are used as the reference pictures. At this time, the picture which minimizes the prediction error is switched on the macro-block basis for determining the prediction reference picture to effectuate motion compensation and encoding to improve the encoding efficiency of spatial scalable encoding to improve the picture quality.

FIG. 1 shows an illustrative picture signal encoder embodying the present invention.

In FIG. 1, the input picture signals and the key signals are first entered to a picture signal hierarchy circuit 1. Meanwhile, the picture signals are such picture signals made up of plural split partial picture signals, namely background picture signals and moving object picture signals encoded separately from each other and together making up a sole picture. The key signals are signals representing the contour information of the split moving object picture. For example, these key signals are binary-valued hard keys or multi-valued soft keys. The picture signal hierarchy circuit 1 splits the input picture signals and key signals into plural hierarchies. Although FIG. 1 shows the structure of two hierarchies, namely a sole upper layer and a sole lower layer, it is also possible to split the signals into three or more hierarchies. For simplicity, it is assumed that the signals are split into two hierarchies.

In case of spatial scalability, the picture signal hierarchy circuit 1 resolution-converts the input picture signals and key signals to generate picture signals and key signals of the lower layer and the upper layer.

Figure 2:
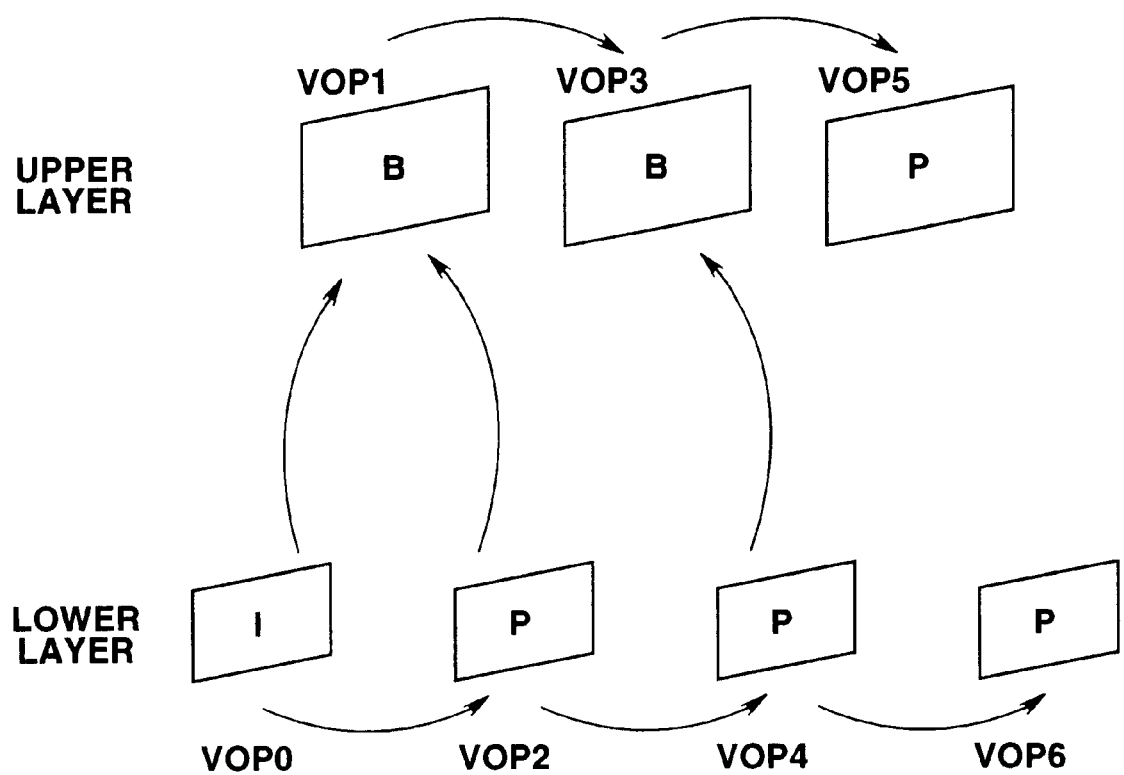
FIG. 2 illustrates an exemplary array of lower layer pictures and upper layer pictures.

In case of temporal scalability (scalability along the time axis direction), the picture signal hierarchy circuit I temporally switches the picture signals and the key signals between the lower layer and the upper layer. In the case of FIG. 2, for example, if pictures VOP0 to VOP6 are supplied sequentially, the pictures VOP0, VOP2, VOP4 and VOP6 are outputted in the lower layer, whilst the pictures VOP1, VOP3 and VOP5 are outputted in the upper layer. In case of this temporal scalability, resolution conversion, such as enhancement or contraction of the picture signals, carried out in case of the spatial scalability, is not carried out.

In case of the so-called SNR (signal-to-noise ratio) scalability, the picture signal hierarchy circuit 1 directly outputs the input picture signals and key signals in the respective layers. That is, the same picture signals and key signals are outputted in the lower and upper layers.

In the present embodiment, the spatial scalability is taken as an example.

In case of, for example, spatial scalability, the picture signal hierarchy circuit 1 outputs picture signals and key signals, which are input picture signals and key signals contracted by way of resolution conversion, as a lower layer. The picture signal hierarchy circuit 1 directly outputs the input picture signals and key signals in the upper layer. This resolution conversion may, for example, be a contracting filtering by a subsampling filter. It is also possible for the picture signal hierarchy circuit 1 to output the input picture signals and key signals enlarged by way of resolution conversion in the upper layer and to output the input picture signals and key signals directly in the lower layer. The resolution conversion in this case is enhancement filtering by e.g., an enhancement filter. It is also possible for the independently generated picture signals and key signals in the upper layer and in the lower layer, respectively. In this case, the resolution of the independently generated picture signals and key signals may be the same or different from each other. It is pre-set which picture signals and key signals are outputted in the upper and lower layers. The picture signals and key signals of the upper layer are sent via a delay circuit 2 to an upper layer encoding circuit 3, whilst the picture signals of the lower layer are sent to a lower layer encoding circuit 5.

The picture signal hierarchy circuit 1, resolution-converting and outputting the input picture signals and key signals in the lower layer and in the upper layer, respectively, also outputs a flag for specifying the multiplication factor of the resolution of the upper layer picture relative to that of the lower layer picture. This flag FR is sent via the delay circuit 2 to a resolution conversion circuit 4 and to the upper layer encoding circuit 3. Meanwhile, the resolution conversion circuit 4 is different from resolution conversion means provided in the picture signal hierarchy circuit 1.

The encoding and decoding for each layer are now explained in this order. Since the encoding and decoding for input picture signals for the upper and lower layers and the encoding and decoding for input key signals of the upper and lower layers are the same, the encoding and decoding for input picture signals for the upper and lower layers are hereinafter explained, while detailed description of the encoding and decoding for the key signals of the upper and lower layers is omitted.

Figure 3:
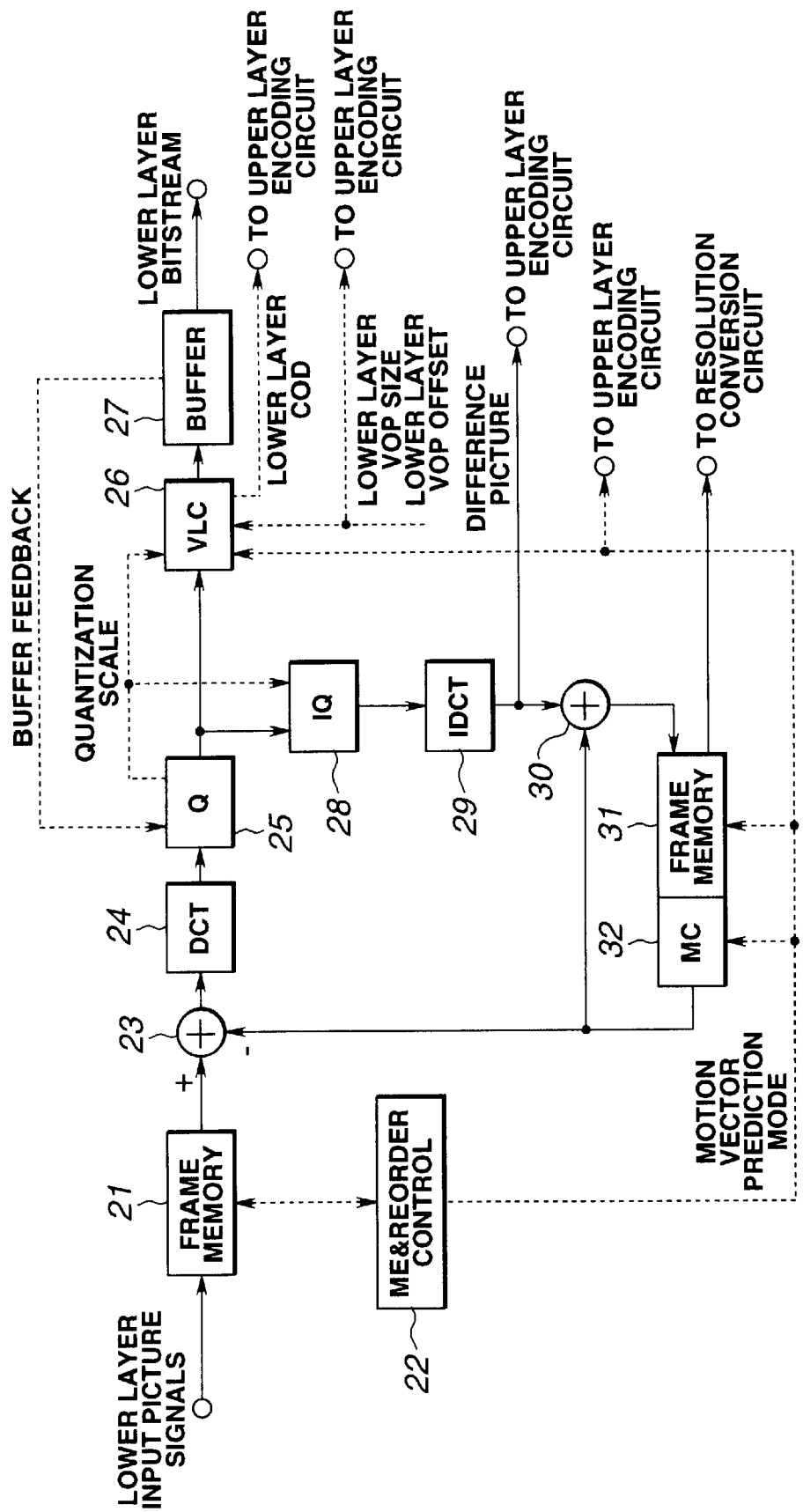
FIG. 3 is a block circuit diagram showing an illustrative structure of a lower layer encoding circuit of the picture signal encoding device.

Referring to FIG. 3, an illustrative structure of the lower layer encoding circuit 5 is specifically explained.

In FIG. 3, the input picture signals of the lower layer, supplied to the lower layer encoding circuit 5, are first entered to a frame memory 21 from which the signals are read out in a pre-set sequence so as to be encoded by the downstream side circuitry. The picture data to be encoded are read out from the frame memory 21 on the macro-block basis so as to be supplied to a motion vector detection circuit 22. The motion vector detection circuit 22 processes the picture data of the respective frames as the I-, P- or B-pictures in accordance with the pre-set sequence. It is pre-set by which of the I-, P- or B-pictures the pictures of the sequentially entered frames are processed (for example, the input frame pictures are processed in the sequence of I, B, P, B, P, . . . , B, P).

The motion vector detection circuit 22 refers to a pre-set reference frame (a forward original picture, a backward original picture, or a picture of an original frame) to perform motion compensation-to detect the motion vector. There are three different prediction modes for motion compensation (inter-frame prediction), namely the forward prediction, backward prediction and bi-directional prediction. The prediction mode for the P-picture is solely the forward prediction, while there are three prediction modes for the B-picture, namely the forward prediction, backward prediction and bi-directional prediction. The motion vector detection circuit 22 selects the prediction mode minimizing the prediction errors to generate the corresponding prediction vector.

The prediction error at this time is compared to the variance values of a macro-block to be encoded and, if it is the variance value of the macro-block that is smaller, it is not the prediction but the intra-frame encoding that is executed in the macro-block. The prediction mode in this case is the intra-picture encoding. The information for the motion vector and the prediction mode is entered to a variable-length encoding circuit 26 and to a motion compensation circuit 32.

The motion vector is also supplied to the picture signal encoding circuit for the upper layer, that is the upper layer encoding circuit 3 of FIG. 1.

The motion compensation circuit 32 generates a prediction reference picture signal, based on a pre-set motion vector, to supply the prediction reference picture signal to an arithmetic unit 23. The arithmetic unit 23 finds the difference between the value of the picture signals for encoding of the frame memory 21 and the value of the prediction reference picture signal from the motion compensation circuit 32 for each macro-block to output the difference signal to a DCT circuit 24. If the macro-block is an intra-coded macro-block, the arithmetic unit 23 directly outputs the picture signals for encoding to the DCT circuit 24. Meanwhile, the motion vector detection circuit 22 and the motion compensation circuit 32 are fed with the lower layer VOP size and the lower layer VOP offset and the respective circuits are utilized. These, however, are not illustrated for evading complexity of the drawing.

The DCT circuit 24 processes the difference signal by DCT (discrete cosine transform) for conversion to DCT coefficients. These DCT coefficients are entered to a quantization circuit 25 so as to be quantized at a quantization step in meeting with the stored data volume of a transmission buffer 27. The resulting quantized data is entered to the variable-length encoding circuit 26.

The variable-length encoding circuit 26 converts the quantized data, supplied from the quantization circuit 25, in meeting with the quantization step supplied from the quantization circuit 25, into variable length codes, such as Huffman codes, and outputs the encoded data to the transmission buffer 27.

The variable-length encoding circuit 26 is also fed with the quantization step (quantization scale) from the quantization circuit 25, prediction mode (mode specifying which of the intra-picture prediction, forward prediction, backward prediction of bi-directional prediction has been set), with the motion vector from the motion vector detection circuit 22, with the flag specifying the size of the lower layer picture (VOP) (lower layer VOP size) and with the flag specifying the position in the absolute coordinate system. These data also are encoded by VLC. Meanwhile, if there is no macro-block data, the macro-block is treated as a skip macro-block. That is, this macro-block has a zero vector value and quantized DCT coefficients equal to zero. A flag COD specifying whether or not data of the macro-block exists is transmitted. If the data of the macro-block exists, COD=0, whereas, if otherwise, that is if the macro-block is a skip macro-block, COD=1. This flag also is sent to the upper layer encoding circuit 3.

The transmission buffer 27 transiently stores the input encoded data to feed back the encoded data corresponding to the stored volume as quantization control signal to the quantization circuit 25. That is, if the stored data volume (residual data volume that can be stored) is increased to an upper tolerable value, the transmission buffer 27 increases the quantization scale of the quantization circuit 25 by the above-mentioned quantization control signal to lower the data volume of the quantized data outputted by the quantization circuit 25. Conversely, should the stored data volume (residual data volume that can be stored) be decreased to a lower tolerable value, the transmission buffer 27 decreases the quantization scale of the quantization circuit 25 by the above-mentioned quantization control signal to increase the data volume of the quantized data outputted by the quantization circuit 25. This prohibits overflow or underflow of the transmission buffer 27.

The encoded data, stored in the transmission buffer 27, is read out at a pre-set timing so as to be outputted as the lower layer bitstream to a transmission channel.

The quantized data outputted by the quantization circuit 25 is also entered to an inverse quantization circuit 28 which then inverse-quantizes the quantized data supplied from the quantization circuit 25 in accordance with the quantization step similarly supplied from the quantization circuit 25. An output signal of the inverse quantization circuit 28 (DCT coefficients) is supplied to an IDCT circuit 29 which then processes the signal with IDCT to send an output signal (picture signals or difference picture signals) to an arithmetic unit 30. If the output signal of the IDCT circuit 29 is the difference signal, the arithmetic unit 30 sums the picture signals of the motion compensation circuit 32 to the difference signal of the IDCT circuit 29 for restoration of the picture signals. If the output signal of the IDCT circuit 29 is an intra-coded macro-block, picture signals from the IDCT circuit 29 are directly outputted so as to be supplied to and stored in a frame memory 31. The motion compensation circuit 32 generates a prediction reference picture using the image of the frame memory 31, motion vector and the prediction mode.

An output signal of the IDCT circuit 29, that is the locally decoded difference signal, is also supplied to the upper layer encoding circuit 3 of FIG. 1.

The frame memory 31 also reads out the pre-set locally decoded picture, in accordance with encoding by the upper layer encoding circuit 3 of FIG. 1, to output the read-out picture to the resolution conversion circuit 4 of FIG. 1.

Reverting to FIG. 1, the resolution conversion circuit 4 converts the resolution of the picture signals supplied from the lower layer encoding circuit 5 by filtering processing as described above (by enlarging processing in the present case) in accordance with the flag FR specifying the multiplication factor of the resolution of the picture of the upper layer relative to the picture of the lower layer and sends the converted resolution to the upper layer encoding circuit 3. If the multiplication factor is 1, that is if the upper layer is as large as the lower layer, the resolution conversion circuit 4 directly outputs the picture signals.

The picture signals of the upper layer, generated by the picture signal hierarchy circuit 1, are sent via the delay circuit 2 to the upper layer encoding circuit 3. The delay circuit 2 delays the picture signals of the upper layer by time required for encoding the picture signals of the lower layer in the lower layer encoding circuit 5.

Figure 4:
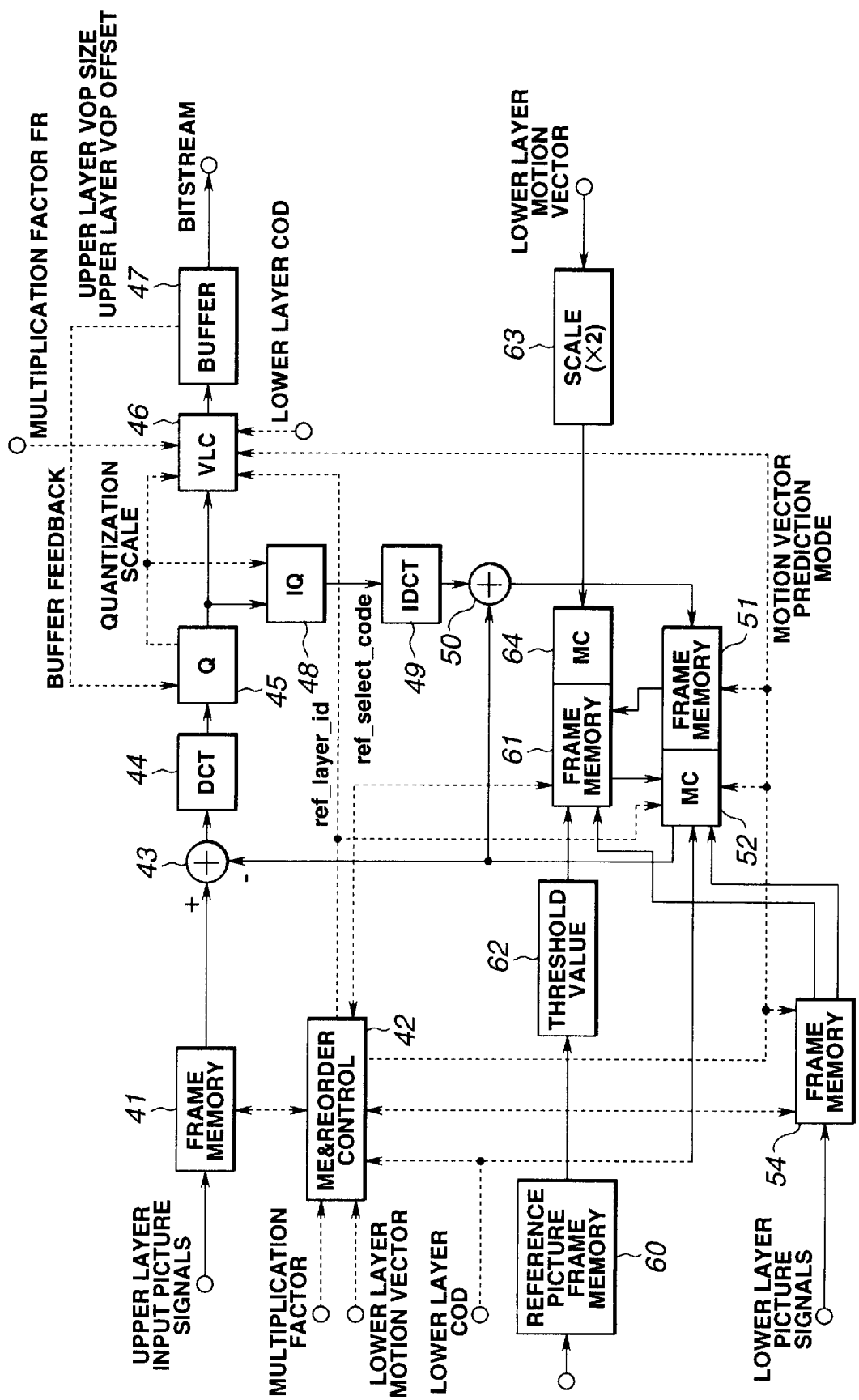
FIG. 4 is a block circuit diagram showing an illustrative structure of an upper layer encoding circuit of the picture signal encoding device.

The specified structure of the upper layer encoding circuit 3 is now explained by referring to FIG. 4.

In FIG. 4, the input picture signals of the upper layer, supplied to the upper layer encoding circuit 3, are first entered and stored in a frame memory 41 from which the stored picture data are read out in a pre-set order for encoding by the downstream: side circuitry. The picture data for encoding are read out from the frame memory 41 on the macro-block basis so as to be supplied to a motion vector detection circuit 42. The motion vector detection circuit 42 processes the picture data of the respective frames as I-, P- or B-pictures in accordance with a pre-set sequence. It is predetermined by which of the I-, P- or B-pictures the pictures of the sequentially entered respective frames are processed. For example, the pictures are processed in the sequence of I, B, P, B, P, . . . , B, P.

Figure 5:
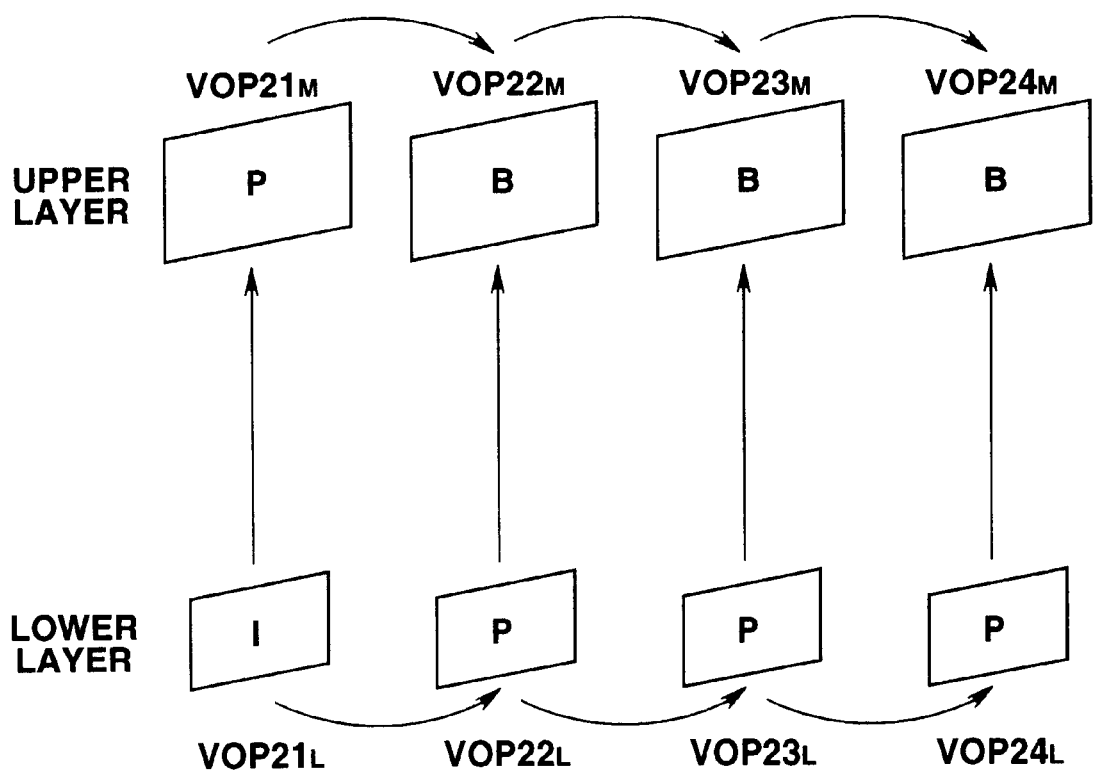
FIG. 5 illustrates encoding for spatial scalability.

For spatial scalability, the picture signals of the upper and lower layers are encoded as shown for example in FIG. 5. Referring to FIG. 5, the first picture $VOP21_L$ of the lower layer is encoded as an I-picture. The second to fourth pictures $VOP22_L$ to $VOP24_L$ of the lower layer are encoded as P-pictures. The reference pictures at this time are encoded using the directly previous picture of the lower layer as reference pictures. The first picture $VOP21_M$ of the upper layer is encoded as a P-picture. The reference picture at this time is the concurrent picture $VOP2_L$ of the lower layer. The second to fourth upper layer pictures $VOP22_M$ to $VOP24_M$ are encoded as B-pictures. These pictures VOP22M to VOP24M are encoded using the respective directly previous upper layer pictures and the concurrent lower layer pictures $VOP22_L$ to $VOP24_L$, as reference pictures. It is noted that the SNR scalability is a specific case of the spatiotemporal scalability in which the upper and lower layers are of the same size, with the encoding sequence being the same as that for the spatial scalability.

The encoding for temporal scalability is performed as shown for example in FIG. 2. Referring to FIG. 2, the first picture of the lower layer VOP0 is encoded as an I-picture. The second to seventh lower layer pictures VOP2 to VOP6 are encoded as P-pictures. The reference pictures are encoded using respective directly previous lower layer pictures as reference pictures. Also, the picture VOP1 of the upper layer is encoded as a B-picture using the lower layer pictures VOP0 and VOP2 as reference pictures. The picture VOP3 of the upper layer is encoded as a B-picture, using the directly previous upper layer picture VOP1 and the picture VOP4 of the lower layer as reference pictures. The picture VOP5 of the upper layer is encoded as a P-picture using the directly previous upper layer picture VOP3 as a reference picture.

The reference pictures for the P- and B-pictures of the upper layer are hereinafter explained.

For prediction of the upper layer pictures, not only pictures of the same layer but also pictures of other hierarchies (scalable layers) can be used as reference pictures. In the two-hierarchy scalability as in the present embodiment, the upper layer can use pictures of the lower layer as reference pictures.

The P-picture, doing forward prediction, can use pictures of the same hierarchy or those of other hierarchies as reference pictures. The B-picture can use pictures of the same hierarchy or those of other hierarchies as reference pictures for forward prediction and backward prediction. It is also possible with the B-picture to use not only the two reference pictures, that is the forward-prediction and backward-prediction pictures, but also a third picture generated from these two reference pictures, as reference pictures for generation of a prediction reference picture.

Figure 6:
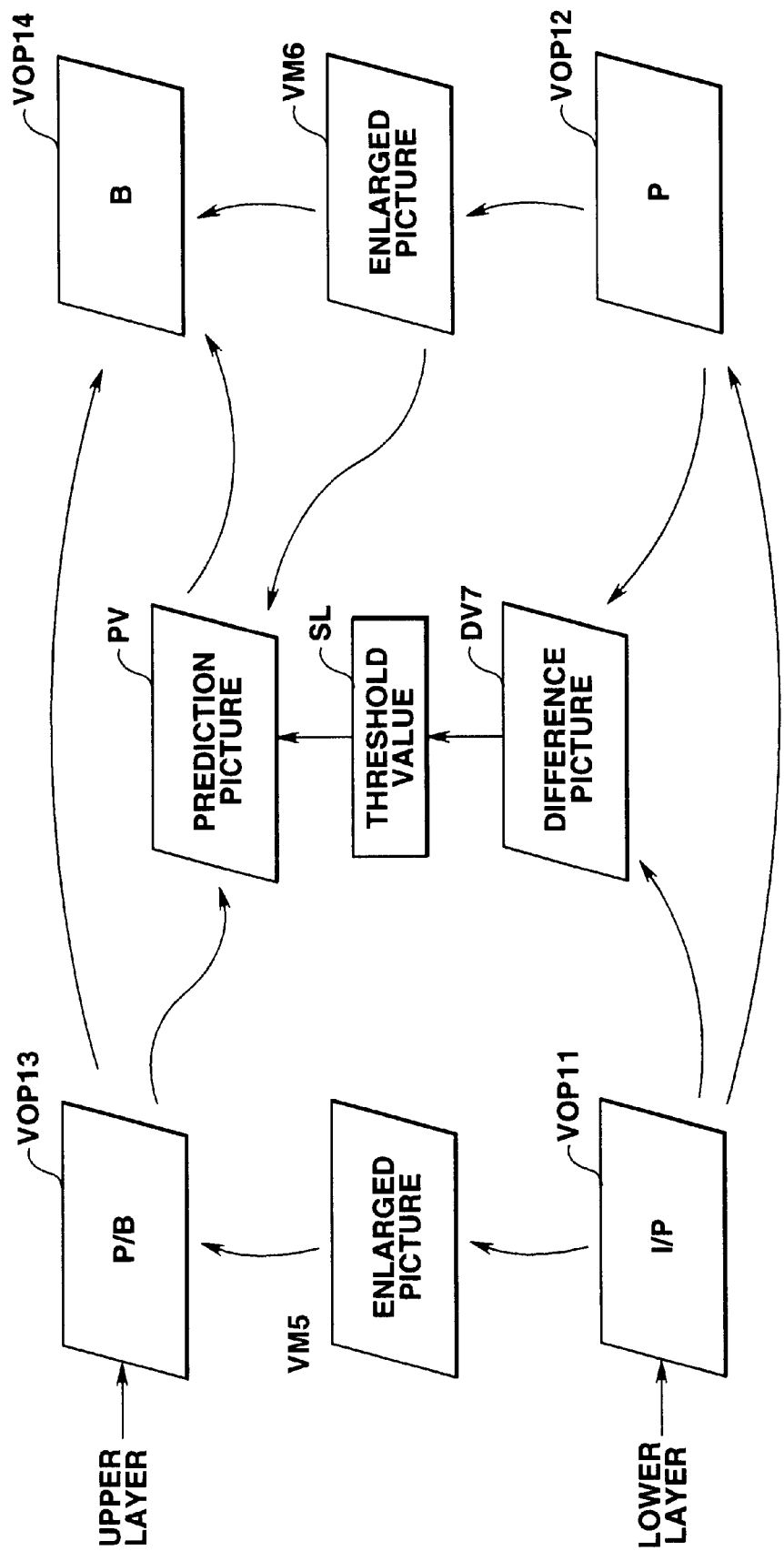
FIG. 6 illustrates a reference picture for P-and B-pictures of the upper layer.

Referring to FIG. 6, pictures VOP11 and VOP12 indicate lower layer pictures and pictures VOP13 and VOP14 indicate upper layer pictures. The picture VOP11 of the lower layer is an I- or P-picture and the picture VOP12 is a P-picture. The upper layer picture VOP13 is a P- or B-picture, while the upper layer picture VOP14 is a B-picture. The lower layer picture is resolution-converted (enlarged) to generate enlarged pictures VM5 and VM6. In FIG. 6, the upper layer picture VOP14 uses the picture VOP13 and the enlarged picture VM6 as a reference picture for forward prediction and as a reference picture for backward prediction, respectively.

In an embodiment of the present invention, a B-picture of the upper layer also uses a picture generated from these two prediction reference pictures as a reference picture. For example, in the case of FIG. 6, the upper layer picture VOP13 and a prediction picture PV generated from the enlarged picture VM6 are used as reference pictures for the B-picture (VOP14) of the upper layer. That is, for encoding the upper layer VOP14, three pictures, namely the picture VOP13, enlarged picture VM6 and the prediction picture PV, are used as reference pictures. Thus, the prediction picture PV is used as a reference picture in the new prediction mode of the present embodiment in addition to the conventional MPEG system.

More specifically, since each reference picture in MPEG has such characteristics that, in case of a larger frame-to-frame variation (difference), the motion compensation efficiency is lowered, such that it is more desirable to use a concurrent picture as a reference picture for achieving a higher efficiency. Thus, in the present embodiment, the enlarged picture VM6 generated from the concurrent lower layer picture as a reference picture for the upper layer picture VOP14 in an area having a large frame-to-frame difference. Moreover, since the picture signals of the upper layer are higher in picture quality than the lower layer picture signals, such that, in case of the small frame-to-frame variation (difference), the prediction errors may be reduced with the use of the upper layer picture. Therefore, in the present embodiment, the directly previous picture of the same hierarchy (upper layer) is used as a reference picture for the picture VOP14 in an area of a small frame-to-frame difference.

Moreover, if there is an overlap of the information of the spatial scalable encoding of the MPEG system, that is if a macro-block the upper layer is encoded at the same time as the information of an associated macro-block of the lower layer (DCT coefficients) is transmitted, and if the prediction is performed using the directly previous picture of the same upper layer as a reference picture, the information of the upper layer is transmitted independently of the information of the lower layer. That is, the information transmitted in the lower layer is not exploited in encoding the upper layer thus possibly lowering the efficiency. Thus, in the present embodiment, if the DCT coefficients of the above-mentioned associated macro-block of the lower layer are transmitted, the lower layer picture is used as a prediction reference picture for reducing overlap in data transmission for improving the encoding efficiency.

Moreover, in the conventional picture signal transmission system, such as MPEG2, in which the prediction mode is switched on the macro-block basis, it is sufficient to switch the prediction mode on the macro-block basis in case of a uniform picture area. However, if a picture exhibits complex movement or is of a larger size, an area varied with time or an area not varied with time co-exist in a sole macro-block, thus possibly lowering the efficiency. Thus, in the present embodiment, the prediction mode is adapted to be switched on the pixel basis for improving the efficiency.

Such pixel-based switching of the prediction mode can be realized by generating a new reference picture in addition to a reference picture of the MPEG2 system. This new reference picture is generated by pixel-based switching and copying of the reference pictures of the upper and lower layers.

For example, in FIG. 6, it is the prediction picture PV that is the reference picture realizing the above-described pixel-based prediction mode switching. That is, the prediction picture is generated on pixel-based copying from the picture VOP13 or the enlarged picture VM6. Therefore, using the prediction picture PV as a reference picture is essentially equivalent to the pixel-based switching of the prediction mode.

The sequence of generating the prediction picture PV is explained with reference to FIG. 6.

For generating the prediction picture PV for the upper layer picture VOP14, it is judged on the pixel basis which of the picture VOP13 or the enlarged picture VM6 is used. In the simplest case, it suffices if the difference of pixels of the lower layer pictures VOP12 and VOP11 in register with each other are taken on the pixel basis and to copy pixels from the lower layer picture, that is the enlarged picture VM6, or the upper layer picture, that is the picture VOP13, if the difference value is larger or not larger than the pre-set threshold value SL, respectively. This discrimination method, however, cannot suppress overlapping of the lower layer information with the upper layer information. Moreover, if an object in a picture has made a translatory movement, motion compensation is carried out correctly, so that the upper layer picture should be used as a prediction reference picture. However, this method perpetually increases the difference and is predicted from the lower layer. Therefore, simply checking variations in pixel values at the same positions cannot cope with translatory movement. Since there are many picture sequences containing the translatory movement, it is mandatory to be able to cope with the translatory movement.

Thus, in the present embodiment, it suffices if the post-IDCT pixel values (that is values prior to motion compensation) are checked to copy pixels from the lower layer picture, that is from the enlarged picture VM6, or from the upper layer picture, that is from the picture VOP13, if the absolute value of the pixel values is larger or not larger than the threshold value SL, respectively, for generating the prediction picture PV. With this discrimination method, the lower layer picture is more liable to be selected as the reference picture if the DCT coefficients are transmitted in the lower layer, thus enabling suppression of overlapping of the upper and lower layers. It is noted that the post-IDCT pixel values become larger if the DCT coefficients are transmitted in the lower layer.

To this end, a difference picture DV7, specifying the frame-to-frame difference of the pictures of the lower layer, is used. This difference picture DV7 is a post-IDCT output of each macro-block.

Turning again to the structure of the device, described above, an output signal of the IDCT circuit 29 in FIG. 3 (locally decoded difference signal of the lower layer) is outputted to the arithmetic unit 30, while being transmitted to the upper layer encoding circuit 3 shown in FIGS. 1 and 4, so as to be recorded in a frame memory 60. The difference picture recorded in the frame memory 60 is the difference picture DV7 in FIG. 6. Consequently, this difference signal DV7 is the difference signal obtained on motion compensation with the motion vector used for encoding the lower layer picture VOP12. The intra-frame coded macro-block of the picture VOP12 is no other than the decoded picture signals of the picture VOP12.

In a threshold circuit 62 of FIG. 4, the above-mentioned threshold value SL is set, such that, if the absolute values of respective pixels (difference values) of the difference picture DV7 exceed the threshold value SL, the pixel values are directly outputted, whereas, if the pixel values of the difference picture DV7 are less than the threshold value SL, the pixel values are set to 0 and outputted.

Figure 7:
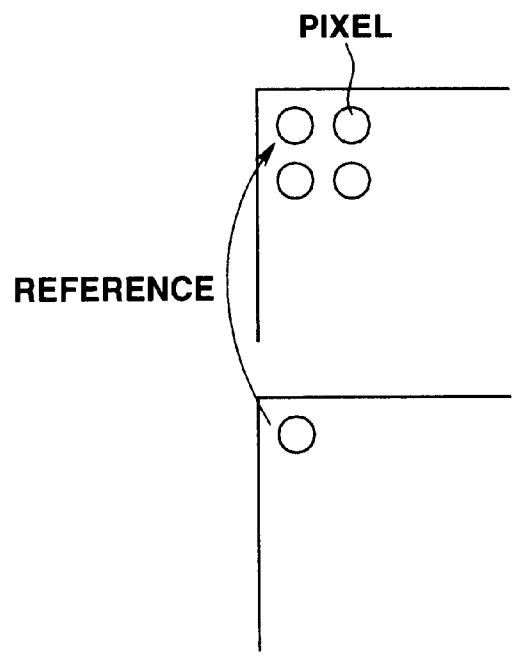
FIG. 7 illustrates an example of correspondence of pixels of a prediction reference picture and a difference picture.

The prediction picture PV is generated from the picture VOP13 and the enlarged picture VM6 by having reference to an output signal of the picture VOP13. FIG. 7 shows an example of correspondence between the pixels of the prediction picture PV and the pixels of the difference picture DV7. FIG. 7 shows a case in which the resolution of the upper layer is twice that of the lower layer. In this case, each pixel of the difference picture DV7 corresponds to four pixels of the prediction picture PV. That is, the four pixels of the prediction picture PV refer to a pixel in the difference picture DV7 for switching.

If the pixel value of th.e difference picture DV7 in register with each pixel of the prediction picture PV is larger than the threshold value SL, the value of the pixel of the prediction picture PV in register with the pixel of the enlarged picture VM6 is directly used as the pixel value of the prediction picture PV.

On the other hand, if the pixel value of the difference picture DV7 in register with the pixel of the prediction picture PV is less than the threshold value SL, that is if the output of the threshold circuit 62 is 0, the pixel of the picture VOP13, motion-compensated using the motion vector of the registering macro-block of the picture VOP12, is used as the pixel value of the prediction picture PV.

The motion vector of the registering macro-block of the picture VOP12 is converted in accordance with the flag specifying the multiplication factor of the resolution of the upper layer with respect to that of the lower layer. If, for example, the resolution of the upper layer is twice that of the lower layer, the value of the motion vector is doubled. The value of a pixel of the picture VOP13 displaced from a position of the prediction picture PV corresponding to the position of the pixel a distance equal to the converted motion vector is used as the pixel value of the prediction picture PV.

To this end, the motion vector supplied from the lower layer is entered to a scale conversion circuit 63 in FIG. 4 so as to be doubled in value. The motion vector is set to 0 for a macro-block devoid of the motion vector (intra-coded macro-block). The doubled motion vector is sent to a motion compensation circuit 64 which then motion-compensates the picture of the frame memory 51 in accordance with the scale-converted motion vector of the lower layer. The motion-compensated picture of the frame memory 51 is sent to a frame memory 61.

In the picture signal encoding configuration of FIG. 4, the difference signal DV7 in FIG. 6 is recorded in the frame memory 60. The prediction picture PV in FIG. 6 is recorded in the frame memory 61.

Figure 8:
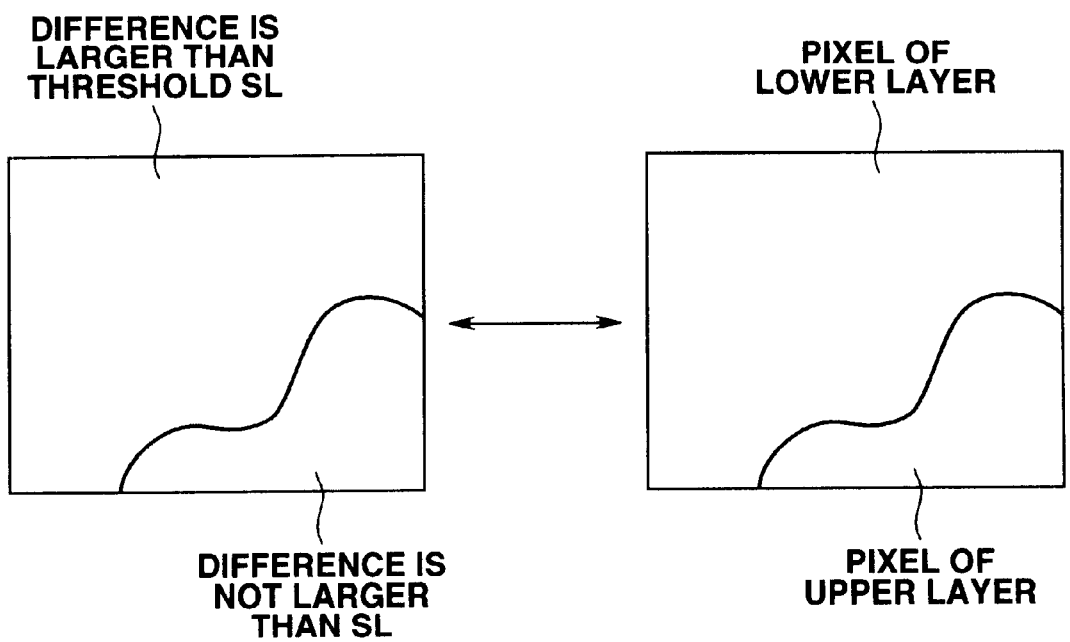
FIG. 8 illustrates an example of a prediction reference picture.

FIG. 8 shows an example of a prediction picture PV. Referring to FIG. 8, an upper layer picture or a lower layer picture is used in an area in which the absolute value of the pixel of the difference picture DV7 is less than or not less than the threshold value SL, respectively.

Figure 9:
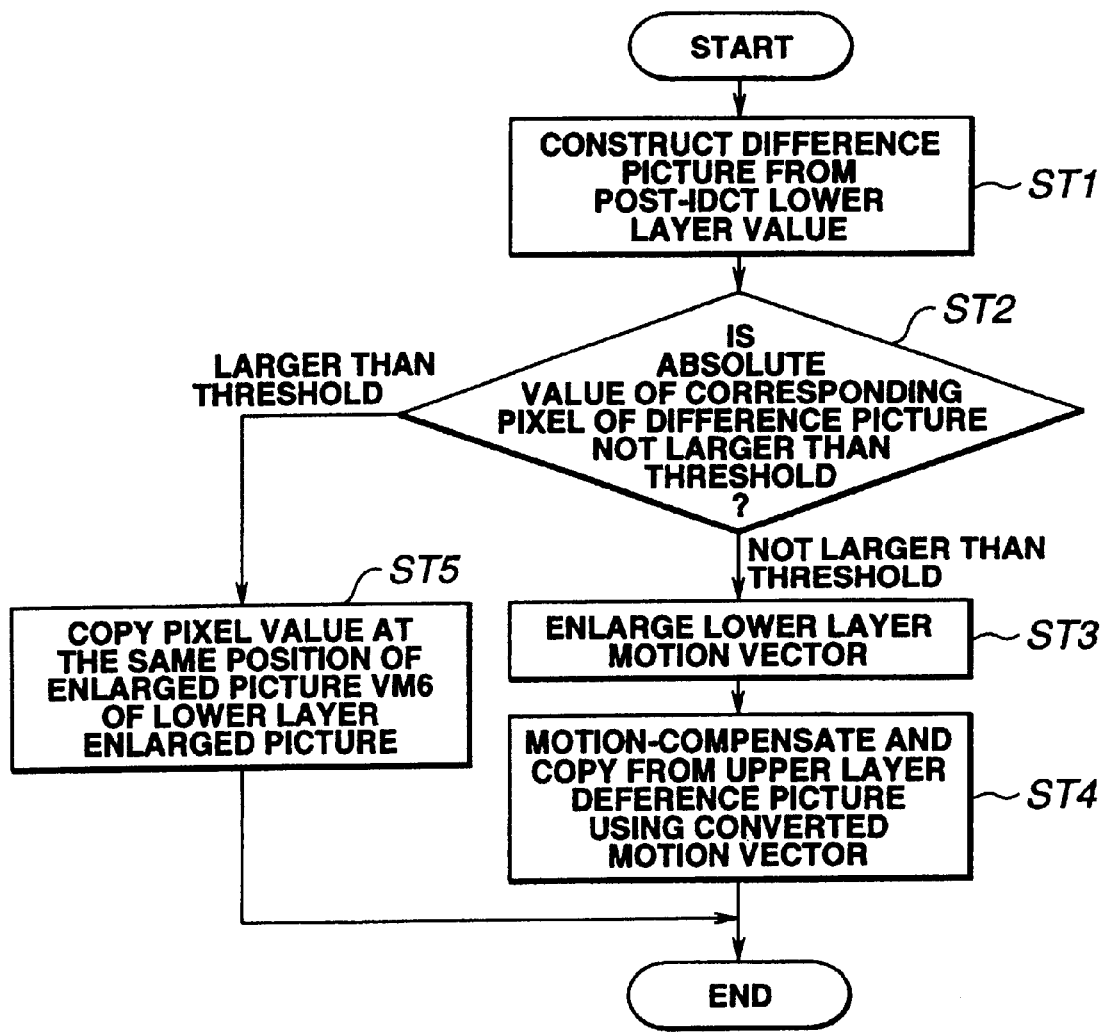
FIG. 9 is a flowchart for illustrating the flow of a method for generating the prediction reference picture.

FIG. 9 shows the flow of a method for generating the above-mentioned prediction picture PV.

At step STI in FIG. 9, a difference picture is generated from the post-IDCT value of the lower layer. At the next step ST2, it is judged whether or not the value of the difference picture at a registering position is not larger than the threshold value SL. If, at step ST2, the value of the difference picture at the registering position is larger than the threshold value SL, processing transfers to step ST5 where the pixel value at the same position of the enlarged picture VM6 of the lower layer is copied.

If, at step ST2, the value of the difference picture at the registering position is not larger than the threshold value SL, processing transfers to step ST3 where the motion vector of the lower layer is doubled. At the next step ST4, the motion vector is carried out using the motion vector and the reference picture of the upper layer is copied for constructing the prediction picture PV.

In the B-picture of the upper layer of the present embodiment, three reference pictures are used for generating the prediction reference picture, as described above. This prediction mode is determined on the macro-block basis.

The prediction mode in the encoding of the upper layer is explained.

The prediction mode is determined on the macro-block basis, as in the encoding of the lower layer. There are following different types of the prediction modes of the upper layer macro-block:

(1) an intra-frame predicted macro-block;

(2) a forward predicted macro-block;

(3) a backward predicted macro-block;

(4) a bi-directional predicted macro-block; and (5) a macro-block predicted on the pixel basis.

Of the above prediction modes, the prediction modes (1) to (4) are similar to the prediction modes of the lower layer macro-blocks. The macro-block predicted on the pixel basis for the prediction mode (5) refers to the prediction picture PV. By having reference to the prediction picture PV, it becomes possible to switch the prediction mode substantially on the pixel basis. In the macro-block predicted on the pixel basis, reference is had to the pixel of the same position of the prediction picture PV. That is, the motion vector is assumed to be zero and no motion vector is encoded.

In the above-mentioned five macro-block prediction modes, such mode which minimizes the prediction errors is selected. The flag specifying the prediction mode is encoded by the variable-length encoding circuit for transmission.

In prediction in the upper layer, as described above, pictures of a scalable layer different from the picture for encoding, such as the lower layer picture of low resolution, can be used as a reference picture for generating the prediction reference picture. It is therefore necessary with the upper layer to transmit a flag specifying which layer picture has been used as a reference picture for generating the prediction reference picture. Thus, a flag specifying which layer picture other than the same layer has been used for generating the prediction reference picture is set, encoded and transmitted for each scalable layer. This flag is the identifier (ref_layer_id) of the syntax as later explained. Also, for each picture (the above-mentioned VOP), a flag specifying from which layer the forward prediction or backward prediction is to be made is set, encoded and transmitted on the basis of the above flag (ref_layer_id). This flag is the identifier (ref_select_code) of the syntax as later explained. The flag in the B-picture (ref_select_code) is shown in the table of FIG. 10. The flag in the B-picture (ref_select_code) is shown in the table of FIG. 11. The syntax will be explained in detail subsequently.

The reference pictures of the upper and lower layers can be freely set within the range prescribed by the table shown in FIG. 10 and the table shown in FIG. 11, in addition to those shown in FIGS. 5 and 2. In the syntax of the Table of FIGS. 10 and 11, there is no definite distinction between spatial scalability and temporal scalability.

If, in the P-picture, the flag (ref_select_code) is '11', the concurrent picture VOP of the layer indicated by the flag (ref_layer-id) may be used as a reference picture for generating the prediction reference picture. This is used for spatial scalability and SNR scalability. Other modes are used for temporal scalability If, in a B-picture, the flag (ref_select_code) is '00', the picture (VOP) directly previously decoded picture (VOP) of the same layer of the concurrent picture (VOP) of the layer indicated by the flag (ref_layer_id) is used as the reference picture for generating the prediction reference picture. This is used for spatial scalability and SNR scalability. Other modes are used for temporal scalability.

Reverting to FIG. 4, the structure of the upper layer encoding circuit 3 is explained.

It is pre-determined by which of the I, P or B picture types are encoded the pictures (VOPs) of the respective layers. The motion vector detection circuit 42 of FIG. 4 sets flags (ref_layer_id) and (ref_select_code), based on the pre-set picture type, and outputs the flags thus set to the motion compensation circuit 62 and to a variable-length encoding circuit 46.

The locally decoded picture signals of the lower layer picture (VOP) are set via the resolution conversion circuit 4 of FIG. 1 to the upper layer encoding circuit 3 so as to be supplied to a frame memory 54.

The motion vector detection circuit 42 refers to a pre-set reference frame from the frame memories 41 or 51, based on the flags (ref_layer_id) and (ref_select_code), in order to perform motion compensation to detect the motion vector. There are four different modes in the motion compensation (frame-to-frame prediction) in the present invention, namely the forward prediction, backward prediction, bi-directional prediction and pixel-based prediction. The motion vector detection circuit 42 selects the prediction mode minimizing the prediction errors and generates the corresponding prediction mode.

In the pixel-based prediction, reference is had to the picture signals recorded in the frame memory 61. In this mode, the motion vector is set to 0.

The prediction errors are compared to the variance of the macro-blocks to be encoded. If it is the variance of the macro-block that is smaller, prediction for the macro-block is not carried out, but the intra-frame coding is performed. The prediction mode in this case is the intra-picture coding. The motion vector and the prediction mode are entered to the variable-length encoding circuit 46 and to a motion compensation circuit 52.

The motion vector detection circuit 42 is also fed with a flag FR specifying by which number of times by which the upper layer is larger than the lower layer. From the table shown in FIG. 11, the case of the B-picture (picture VOP) is the special case of the spatiotemporal scalability of the flag (ref_select_code=="00"). At this time, the backward prediction is prediction from the lower layer, while forward prediction is prediction from the picture (VOP) of the same layer decoded directly previously using the backward prediction. If the flag specifying the multiplication factor is 1 (with the lower layer being equal in resolution to the upper layer), and the flag is (ref_select_code=="00"), the case is a spacial case of spatial scalability, that is SNR scalability. In this case, the motion vector and the prediction mode used by the concurrent VOP of the lower layer are directly used as the forward prediction of the upper layer. Therefore, in this case, the motion vector detection circuit 42 sends the motion vector and the prediction mode from the lower layer to the motion compensation circuit 52. In this case, the motion vector is not encoded in the variable-length encoding circuit 46.

In the B-picture (VOP), the pixel-based prediction mode is used only for the flag (ref_select_code=="00"). That is, in the B-picture, the pixel-based prediction mode is used only when the lower layer picture concurrent as the upper layer is used as the reference picture. Meanwhile, the motion vector detection circuit 42 is fed with the flag from the lower layer encoding circuit 5 (lower-layer COD) so as to be used for detecting the motion vector.

In the motion compensation circuit 52, the prediction reference picture is generated from the reference picture stored in the frame memories 51 and 54, based on the pre-set motion vector, so as to be supplied to an arithmetic unit 43 as prediction reference picture signals. Meanwhile, the motion vector detection circuit 42 and the motion compensation circuit 52 exploit the upper layer VOP size, lower layer VOP offset, lower layer VOP size and the lower layer VOP offset. These, however, are not shown for evading complexity of the drawing.

The arithmetic unit 43 outputs to a DCT circuit 24 the difference signal between the value of the picture signals to be encoded and the value of the prediction reference picture signal. If the macro-block is an intra-coded macro-block, the arithmetic unit 43 directly outputs the signal of the macro-block to be encoded directly to a DCT circuit 44.

The DCT circuit 44 processes the macro-block signals with DCT for conversion to DCT coefficients. These DCT coefficients are entered to a quantization circuit 45 so as to be quantized with the quantization step in meeting with the stored data volume in a transmission buffer 47 (buffer stored volume). The resulting quantized data are entered to the variable-length encoding circuit 46.

The variable-length encoding circuit 46 converts the quantized data supplied from the quantization circuit 45 in meeting with the quantization step (scale) supplied from the quantization circuit 45 (herein data of an I-picture) to, for example, variable length codes, such as Huffman codes, and outputs the encoded data to the transmission buffer 47. Meanwhile, the variable-length encoding circuit 46 is fed with a flag from the lower layer encoding circuit 5 (lower-layer COD) so as to be used for encoding by VLC.

The variable-length encoding circuit 46 is also fed with the quantization step (scale) from the quantization circuit 45, while being fed from the motion vector detection circuit 42 with the prediction mode (mode specifying which of the intra-picture prediction, forward prediction, backward prediction, bi-directional prediction and pixel-based prediction has been set). These data are also encoded with VLC.

The variable-length encoding circuit 46 is also fed with the flag specifying the size of the upper layer picture (VOP) (upper layer VOP size) and a flag specifying the position in the absolute coordinate system (upper layer VOP offset). These data are also encoded.

The variable-length encoding circuit 46 is also fed with a flag specifying by which number of times the resolution for the lower layer is higher than that of the lower layer. This data is also encoded.

The transmission buffer 46 transiently stores the input encoded data and outputs data corresponding to the stored volume to the quantization circuit 45.

If the stored data volume in the transmission buffer 47 is increased to an allowable upper limit value, the transmission buffer 47 increases the quantization scale of the quantization circuit 45 by the quantization control signal to decrease the data volume of the quantized data. Conversely, if the stored volume (residual data volume that can be stored) is decreased to the allowable lower limit value, the transmission buffer 47 decreases the quantization scale of the quantization circuit 45 to increase the data volume of the quantized data. This prevents overflow or underflow of the transmission buffer 47.

The data stored in the transmission buffer 47 is read out at a pre-set timing and outputted on the transmission channel.

On the other hand, the quantized data outputted by the quantization circuit 45 is also entered to an inverse quantization circuit 48 so as to be inverse-quantized in accordance with the quantization step supplied from the quantization circuit 45. An output signal of the inverse quantization circuit 48 (DCT coefficients obtained by the inverse quantization) is entered to an IDCT circuit 49 for inverse quantization. The resulting output signal (picture signal or difference signal) is sent to an arithmetic unit 50. If the output signal of the IDCT circuit 49 is a difference signal, the arithmetic unit 50 restores the picture signal which is the sum signal of the picture signal of the motion compensation circuit 52 and the difference signal from the IDCT circuit 49. If the output signal of the IDCT circuit 49 is an I-picture, the arithmetic unit 50 directly outputs the picture signals from the IDCT circuit 50. The picture signals are stored in the frame memory 51.

Returning to FIG. 1, the bitstream of the upper layer and the bitstream of the lower layer, which are output bitstreams of the upper layer encoding circuit 3 and the lower layer encoding circuit 5, respectively, are entered to a multiplexing circuit 6. The multiplexing circuit 6 multiplexes the bitstream of the upper layer and the bitstream of the lower layer to output the resulting bitstream. This bitstream is transmitted over a transmission channel 7 to a receiver or supplied to a recording device, not shown, for recording on a recording medium 8.

Figure 12:
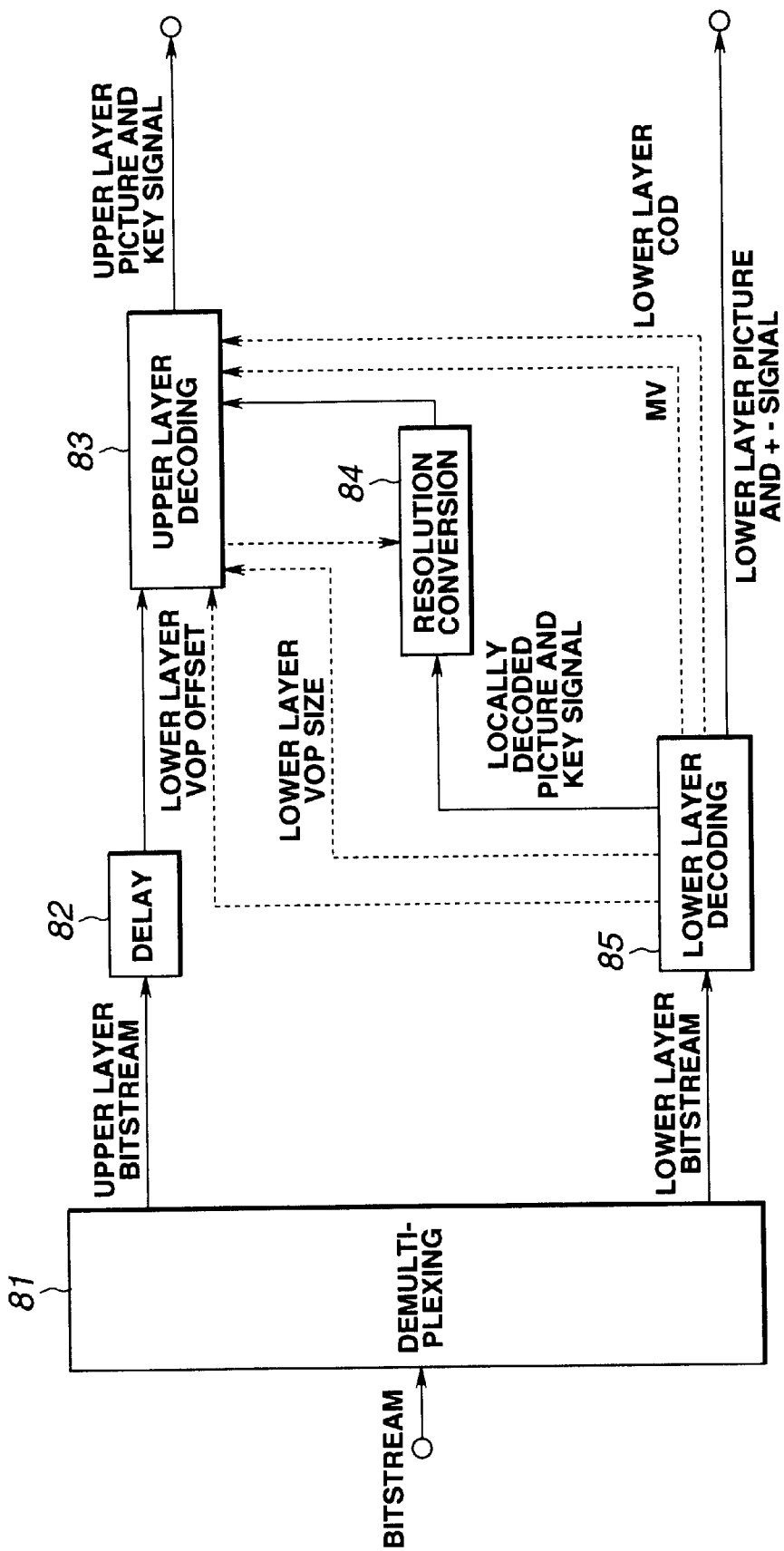
FIG. 12 is a schematic block circuit diagram showing the structure of a picture signal decoding device for carrying out the picture signal decoding method of the present invention.

FIG. 12 shows an example of a picture signal decoding device which is a counterpart of the picture signal encoding device shown in FIG. 1.

In FIG. 12, the bitstream, supplied over a transmission channel 86, is received by a receiver, not shown, or recorded on a recording medium 87 so as to be reproduced by a reproducing device, not shown. This bitstream is first entered to a demultiplexing circuit 81 which then demultiplexes the bitstream, that is splits the bitstream into upper and lower layer bitstreams, which are outputted.

The lower layer bitstream is directly supplied to a lower layer decoding circuit 85, while the upper layer bitstream is supplied via a delay circuit 82 to an upper layer decoding circuit 83.

The delay circuit 82 sends the upper layer bitstream to the upper layer decoding circuit 83 after delay introduced by the delay circuit 82. This delay corresponds to the time required in decoding one picture (1 VOP).

Figure 13:
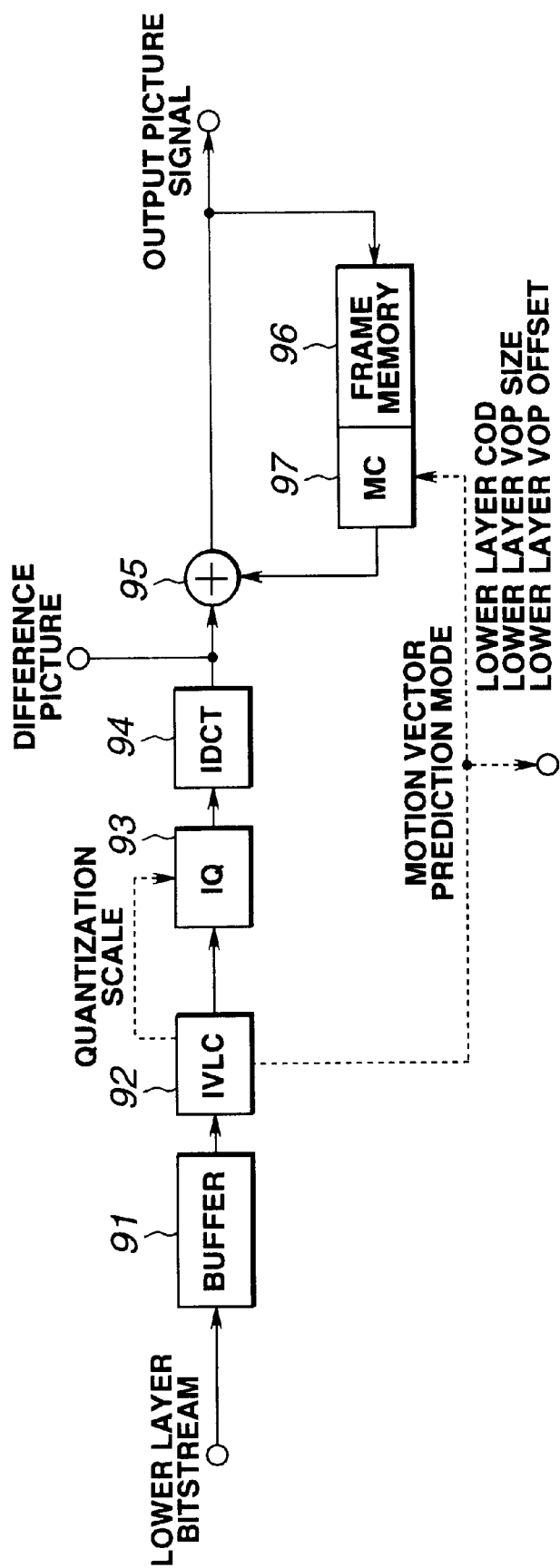
FIG. 13 is a block circuit diagram showing the structure of a lower layer decoding circuit of a picture signal decoding device.

Referring to FIG. 13, an illustrative structure of the lower layer decoding circuit 85 is explained.

The lower layer bitstream is transiently stored in a reception buffer 91 so as to be supplied as encoded data to a variable-length decoding circuit 92, which then variable-length decodes the encoded data supplied from the reception buffer 91 to output the motion vector and the prediction mode to the motion compensation circuit 97. The variable-length decoding circuit 92 also outputs the quantization step to the inverse quantization circuit 93, while outputting the variable-length decoded quantized data to an inverse quantization circuit 93.

The variable-length decoding circuit 92 also decodes a flag specifying the size of the picture (VOP) of the lower layer (lower layer VOP size) and a flag specifying the position in the absolute coordinate system (lower layer VOP offset) to output the decoded flags to be used at the motion compensation circuit 97 to; the motion compensation circuit 97 and to a frame memory 96. The flags, motion vector and the prediction mode are also supplied to the upper layer decoding circuit 83 of FIG. 12. The variable-length decoding circuit 92 decodes the flag COD specifying whether the macro-block is a skip macro-block and sends the decoded flag to the upper layer decoding circuit 83 as the motion compensation circuit 97.

The inverse quantization circuit 93 inverse-quantizes the quantized data supplied from the variable-length decoding circuit 92 in accordance with the quantization step similarly supplied from the variable-length decoding circuit 92 to send an output signal to an IDCT circuit 94. An output signal of the inverse quantization circuit 93 (DCT coefficients) are IDCTed by the IDCT circuit 94, an output signal (picture signal or difference picture signal) of which is sent to an arithmetic unit 95.

An output signal (output picture signal) of the IDCT circuit 94 is also supplied to the lower layer decoding circuit 85.

If the picture signal supplied from the IDCT circuit 94 is I-picture data, the picture signal is directly outputted by the arithmetic unit 95 so as to be supplied to and stored in the frame memory 96 for generating prediction reference picture signals of the difference picture signal (data of the P- or B-picture) subsequently entered to the arithmetic unit 95. The picture signal is also directly outputted to outside as a reproduced picture.

If the input bitstream is a P- or B-picture, the motion compensation circuit 97 generates a prediction reference picture in accordance with the prediction mode and the motion vector supplied from the variable-length decoding circuit 92 to output a prediction reference picture signal to the arithmetic unit 95. The arithmetic unit 95 sums the difference picture signal entered from the IDCT circuit 94 to the prediction reference picture signal supplied from the motion compensation circuit 97 to output the resulting sum signal as an output playback picture. If the input bitstream is a P-picture, the picture signal from the arithmetic unit 95 is entered to and stored in the frame memory 96 so as to be used as a reference picture of the picture signal decoded next.

Returning to FIG. 12, the upper layer bitstream, demultiplexed by the demultiplexing circuit 81, is supplied via the delay circuit 82 to the upper layer decoding circuit 83.

Figure 14:
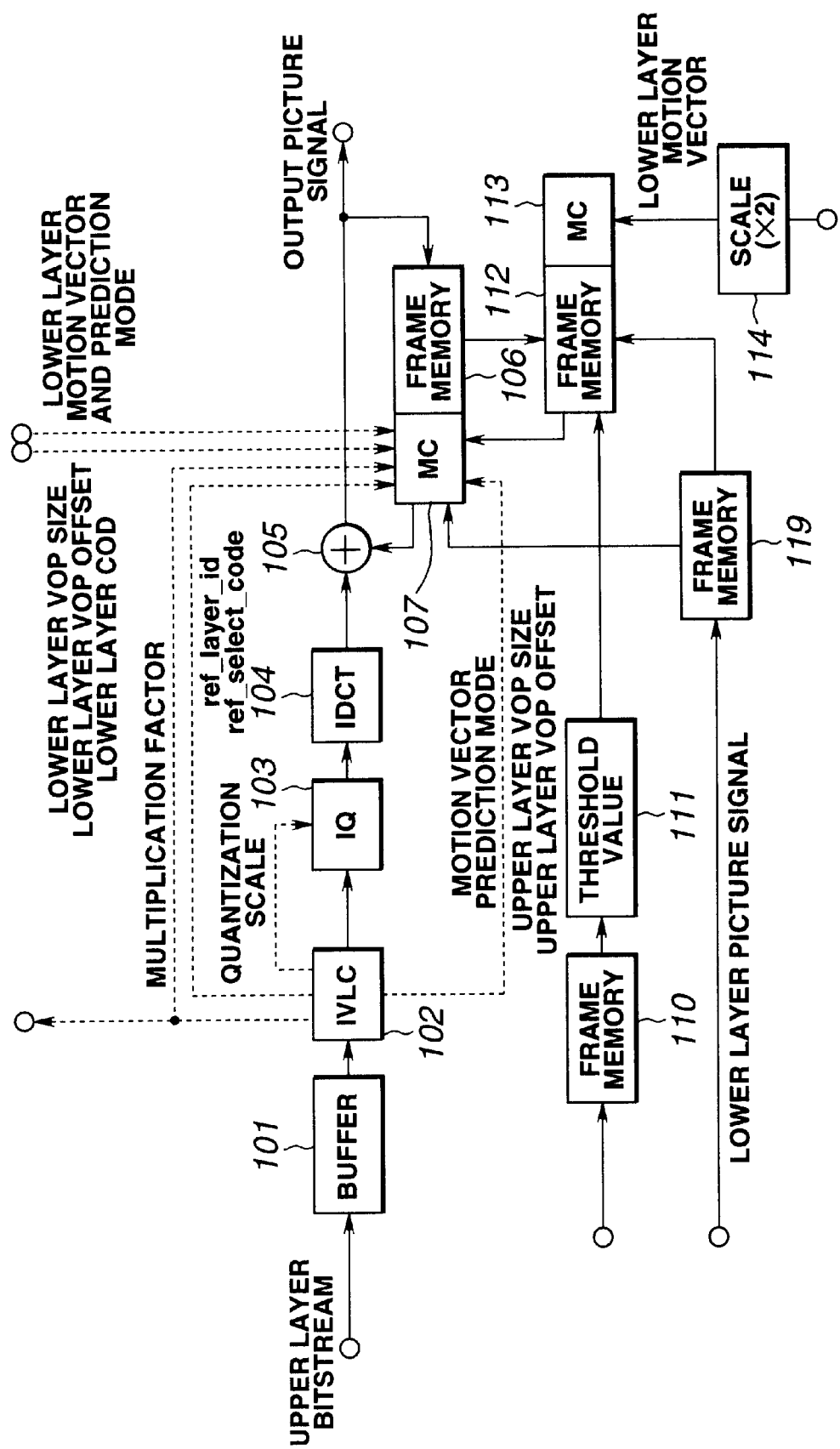
FIG. 14 is a block circuit diagram showing the structure of an upper layer decoding circuit of a picture signal decoding device.

Referring to FIG. 14, an illustrative structure of the upper layer decoding circuit 83 is explained.

The upper layer bitstream is transiently stored in a reception buffer 101 so as to be supplied as encoded data to a variable-length decoding circuit 102. The variable-length decoding circuit 102 variable-length decodes the encoded data supplied from the reception buffer 101 to output the motion vector and the prediction mode to the motion compensation circuit 107 as well as to output the quantization step to an inverse quantization circuit 103. The variable-length decoded quantized data is outputted to the inverse quantization circuit 103.

The variable-length decoding circuit 102 also decodes the flag (upper layer VOP size) specifying the size of the picture VOP of the upper layer and a flag specifying the position in the absolute coordinate system (upper layer VOP offset) to output the decoded flag to be used at the motion compensation circuit 107 and to the frame memory 106.

The variable-length decoding circuit 102 decodes the flag FR specifying the multiplication factor of the size (resolution) of the upper layer picture VOP with respect to the size of the lower layer picture VOP to output the decoded flag for use at the motion compensation circuit 107 to the motion compensation circuit 107 and to the resolution conversion circuit 84.

The resolution conversion circuit 84 in FIG. 12 resolution-converts the picture signals of the decoded lower layer picture VOP and key signals in accordance with the flag FR specifying the multiplication factor to supply the resulting signals to a frame memory 119 in the upper layer decoding circuit 83.

The variable-length decoding circuit 102 also decodes the flags specifying the layer used for prediction reference (ref_layer_id and ref_select_code) to output the decoded flag to the motion compensation circuit 107.

The inverse quantization circuit 103 inverse-quantizes the quantized data supplied form the variable-length decoding circuit 102 in accordance with the quantization step similarly supplied from the variable-length decoding circuit 102 to output the inverse-quantized data to an IDCT circuit 104. An output the IDCT circuit 103 (DCT coefficients) is IDCTed by the IDCT circuit 104 an output signal (picture signal or difference picture signal) of which is sent to an arithmetic unit 105.

If the picture signal supplied by the IDCT circuit 104 is an I-picture, the picture signal is directly outputted by the arithmetic unit 105 so as to be supplied to and stored in a frame memory 106. The picture signal is also outputted as playback signal to outside.

If the input bitstream is a P- or B-picture, the motion compensation circuit 107 generates a prediction reference picture from the picture signal from a frame memory 106 and the picture signal from a frame memory 119 in accordance with the flags specifying the motion vector supplied from the variable-length decoding circuit 102, prediction mode and the flag (ref_layer_id) and (ref_select_code) specifying the layer for reference to output prediction reference picture signals to the arithmetic unit 105. At this time, the upper layer VOP size, upper layer VOP offset, lower layer VOP size and the lower layer offset are also used. The arithmetic unit 105 sums the difference signal entered from the IDCT circuit 104 to the prediction reference picture signals supplied from the motion compensation circuit 107 to output the resulting sum signal as an output playback signal. If the input bitstream is a P-picture, the picture signal from the arithmetic unit 105 is entered to and stored in the frame memory 106 so as to be used as a prediction reference picture for the picture signals decoded next.

The upper layer decoding circuit 83 of FIG. 12 generates the prediction reference picture in the same way as when generating the prediction picture PV of FIG. 6 in the encoding circuit to store the generated picture in a frame memory 112 shown in FIG. 14.

An output signal of the IDCT 94 in the lower layer decoding circuit 85 of FIG. 13 (picture signal or difference picture signals) is supplied to the upper layer decoding circuit 83 and thence supplied to the frame memory 110 of FIG. 14. Similarly to the threshold circuit 62 in the encoding circuit of FIG. 4, a threshold circuit 111 checks whether or not the absolute value of the signal recorded in the frame memory 110 exceeds the threshold value SL to output 0 if the absolute value is less than the threshold value SL. If the absolute value exceeds the threshold value SL, the threshold circuit 111 directly outputs the signal of the frame memory 110.

The prediction reference picture signal recorded in the frame memory 110 is generated by being copied from the frame memory 106 or 119 depending on whether the value of the difference picture signal at a registering position recorded in the frame memory 110 is larger than the threshold value SL or otherwise. If the output at the registering position of the threshold circuit 111 is 0, that is if the frame-to-frame difference is small, copying is from the upper layer picture signal, that is from the frame memory 106. At this time, the motion vector supplied from the lower layer decoding circuit 85 of FIG. 12 is used for performing motion compensation.

The motion vector supplied from the lower layer decoding circuit 85 is doubled by a scale conversion circuit 114. The doubled motion vector is supplied to a motion compensation circuit 113. In copying pixels from the frame memory 106, the motion compensation circuit 113 executes motion compensation in accordance with the motion vector supplied from the scale conversion circuit 114 to copy the pixels.

If, in generating the prediction reference picture recorded on the frame memory 112, a corresponding output of the threshold circuit 111 is other than 0, the pixel of the lower layer, that is the pixel of the same position of the picture signal recorded in the frame memory 119, is copied without performing motion compensation.

The prediction reference picture signal, thus generated, is recorded in the frame memory 112 so as to be used for prediction along with the pictures of the frame memories 106, 119.

If the flag specifying the multiplication factor is 1 and the flag is (ref_select_code=="00"), the motion compensation circuit 107 generates the prediction reference picture signal using the motion vector and the prediction mode supplied from the concurrent picture (VOP) of the lower layer to output the generated signal to the arithmetic unit 105.

An illustrative syntax of the scalable encoding is hereinafter explained. In the following explanation of the syntax, only the portions relevant to the present invention are explained, while the explanation of the remaining portions is omitted.

Figure 15:
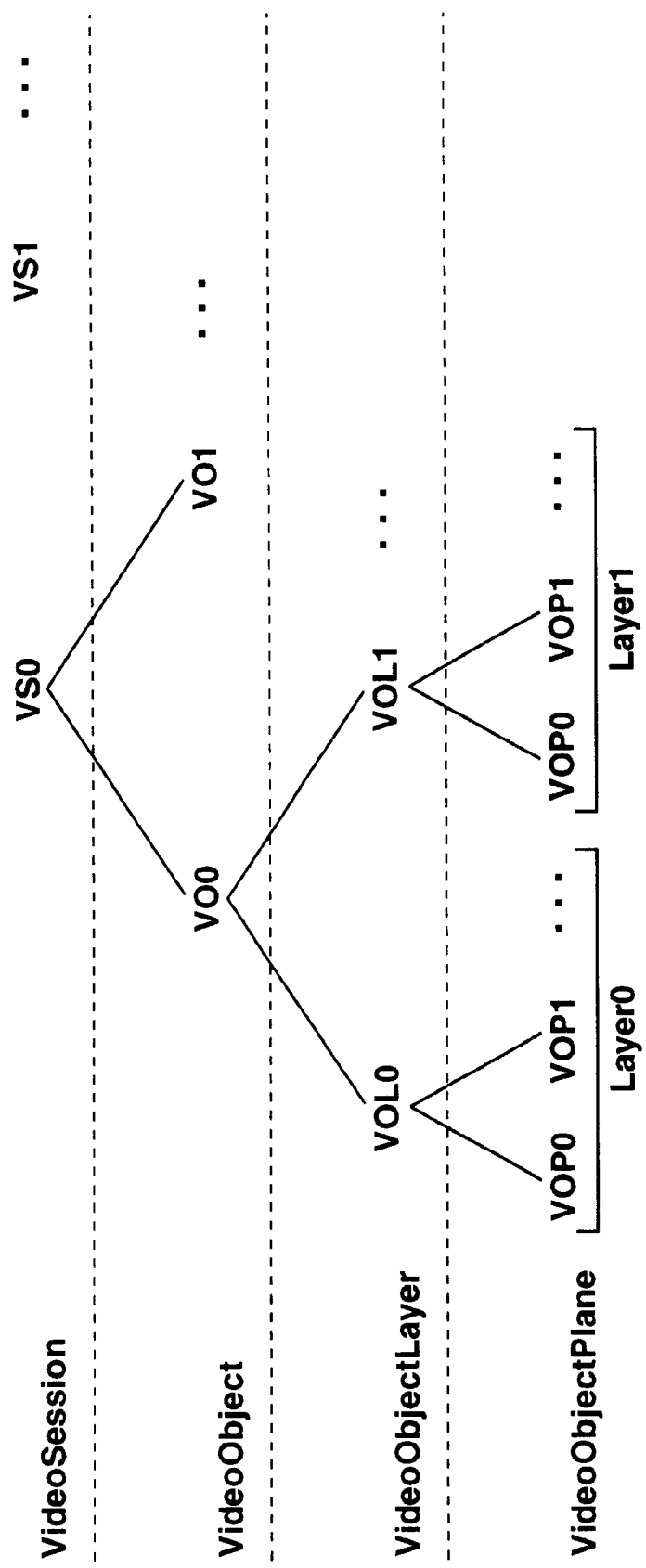
FIG. 15 illustrates the hierarchy structure of the video syntax.
Figure 21:
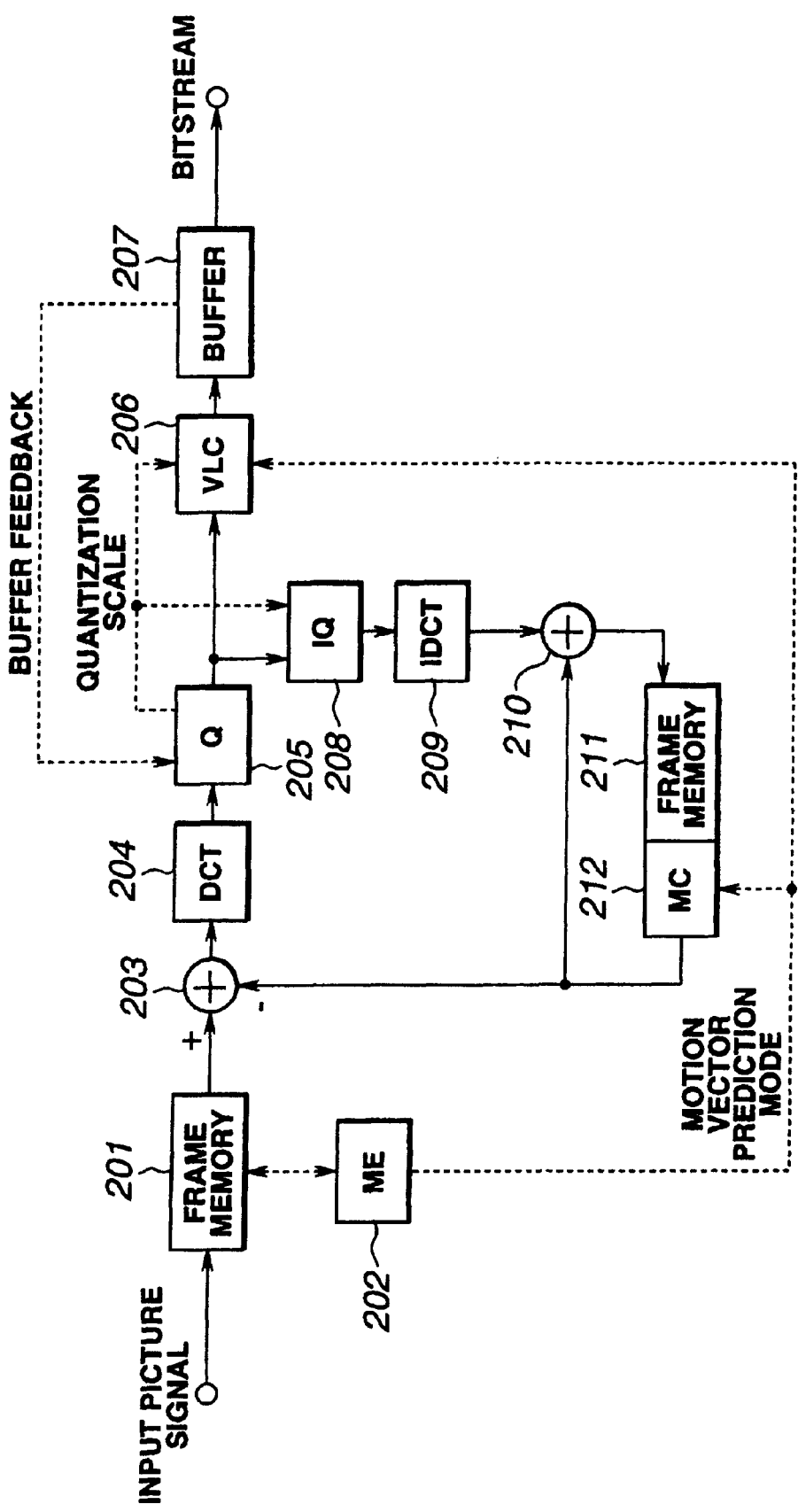
FIG. 21 is a schematic block circuit diagram showing an illustrative structure of a conventional encoder of MP@ML of the MPEG system.
Figure 22:
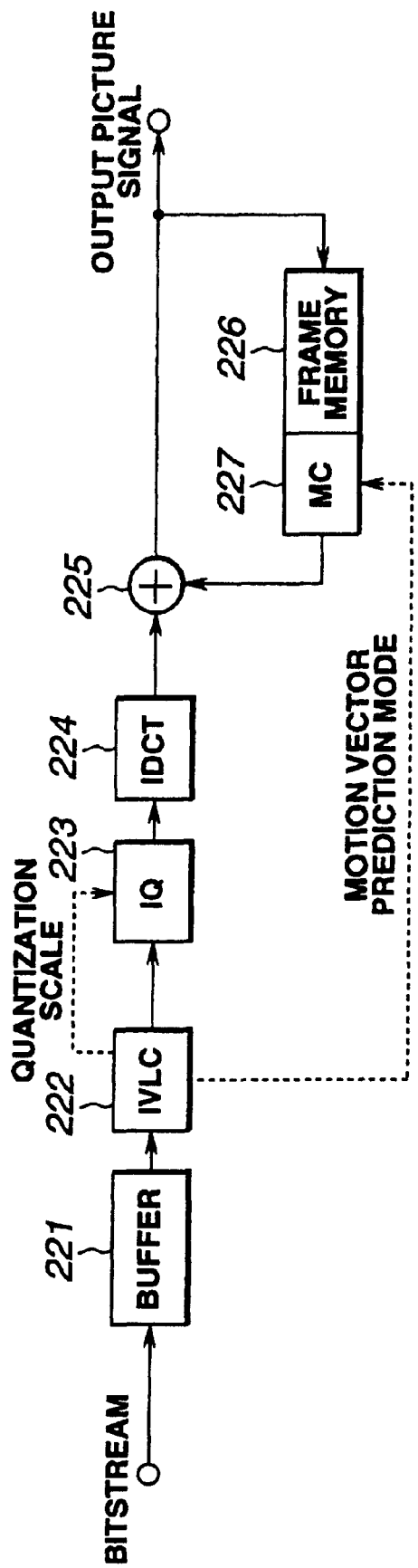
FIG. 22 is a schematic block circuit diagram showing an illustrative structure of a conventional decoder of MP@ML of the MPEG system.
Figure 23:
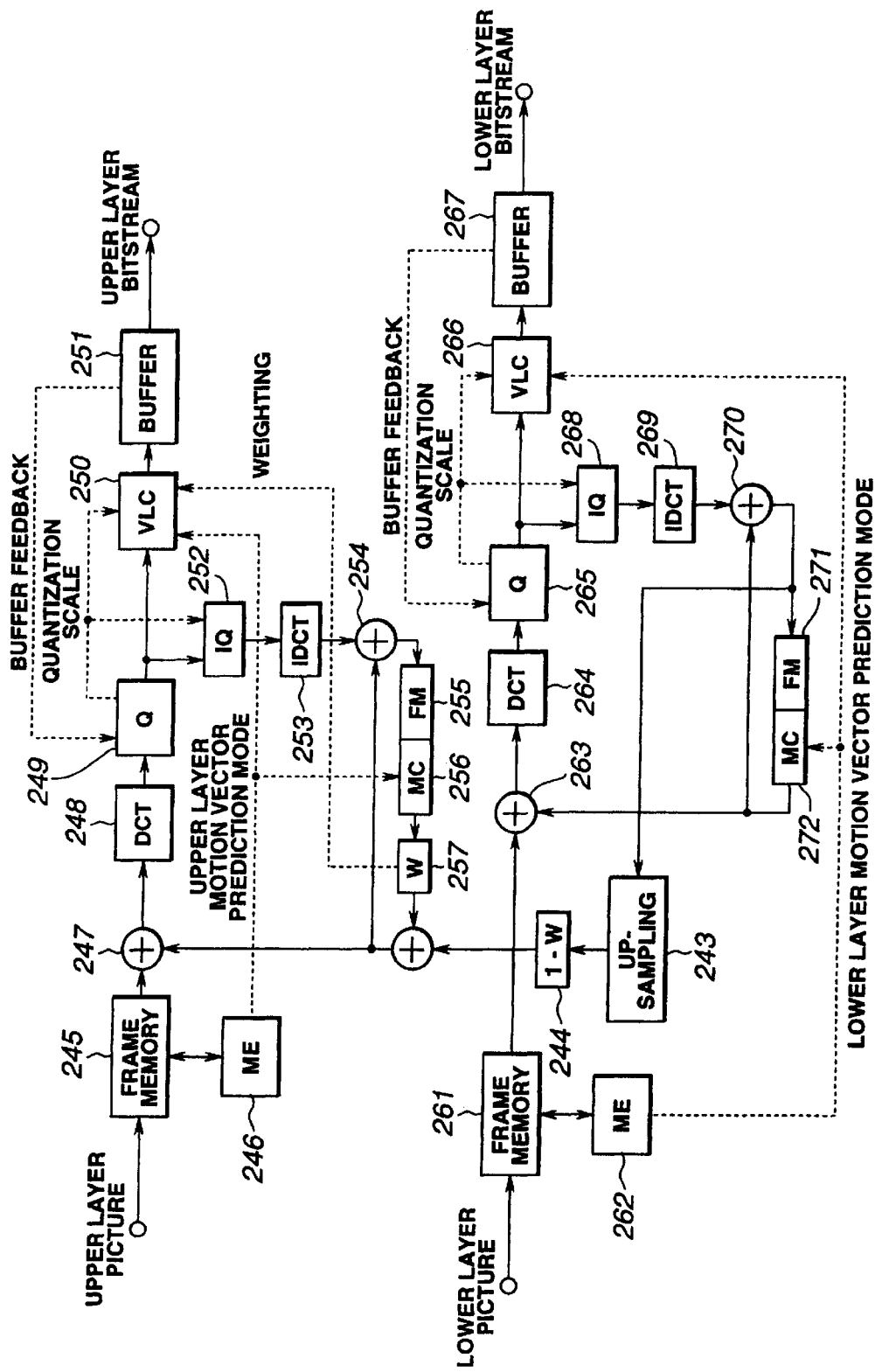
FIG. 23 is a block circuit diagram showing an illustrative structure of a conventional encoder of spatial scalability.
Figure 24:
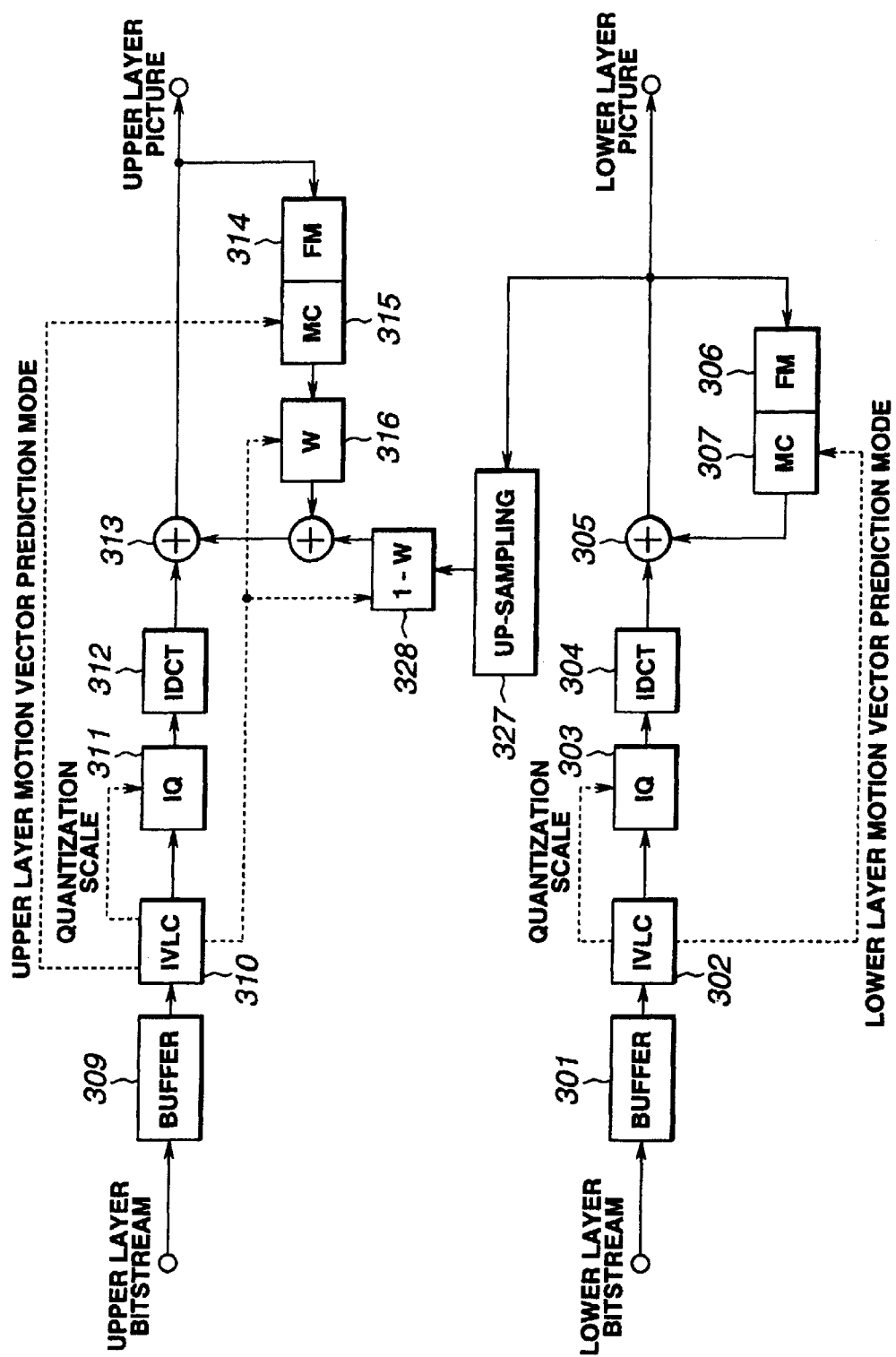
FIG. 24 is a block circuit diagram showing an illustrative structure of a conventional decoder of spatial scalability.

FIG. 15 shows the structure of a bitstream. VS (Video Session Class) is a set of bitstreams constructed by one or more VO (Video Object Class).

The following is the VS syntax which conforms to the so-called C++.

| Syntax | Nos. of Bits | Mnemonic |
|---|---|---|
| VideoSession(){ | | |
| Video_session < start_code | sc + 8 = 32 | |
| do*{ | | |
| videoobject() | | |
| }while (nextbits_bytealigned()== | | |
| video_object_start_code) | | |
| next_start code() | | |
| video_session_end_code | sc + 8 = 32 | |
| ) | | |

The following is the syntax of VO (Video Object Class).

| Syntax | Nos. of bits | Mnemonics |
|---|---|---|
| Videoobject(){ | | |
| video_object_start_code | sc + 3 = 27 | |
| video_object_'id | 5 | |
| do{ | | |
| videoObjectLayer() | | |
| } while (nextbits_bytealigned()== | | |
| video_object_layer_start_code | | |
| next_start code() | | |

It is noted that VO is a bitstream of an object of a portion in a picture or in an entire picture. VO (Video Object Layer Class) is a class for scalability.

The following is the syntax of VOL.

| Syntax | Nos. of bits Mnemonic |
|---|---|
| VideoObjectLayer( ) { | |
| video_object_layer_start _code | sc + 4 = 28 |
| video_object_layer_id | 4 |
| video_object_layer_shape | 2 |
| if (video_object_layer_shape=="00"){ | |
|     video_object_layer_shape_width | 10 |
|     video_object_layer_shape_height | 10 |
| } | |
| video_object_layer_shape_effects | 4 |
| if ((video_object_layer_shape_effects=="0001) | |
| \|\|(video_object_lauer_shape_effects=="0011" | |
| \|\|(video_object_layer_shape_effects=="0100" | |
| \|\|(video_object_layer_shape_effects=="01011") | |
|     video_object_layer_feather_dist | 3 |
| if((video_object_layer_shape_effects=="0100") | |
| \|\|(video_object_layer_shape_effects=="0100"){ | |
|     for(i=0; i<video_object_layer_feather_dist; i++) | |
|       feathering_filter( ); | 8*15 |
| } | |
| video_object_layer_sprite_usage | 2 |
| if(video_object_layer_sprite_usage!= | |
| SPRITE_NOT_USED)( | |
|   if(video_object_layer_sprite_usage== | |
| ON-LINE_SPRITE)( | |
|     sprite_hdim | 13 |
|     sprite_vdim | 13 |
|   } | |
|   no_of_sprite_points | 6 |
|   for(i=0; i<no_of_sprite_points; i++){ | |
|     sprite_point [i]_x_coordinate | 13 |
|     sprite_point [i]_y_coordinate | 13 |
|   } | |
|   lighting_change_in_sprite | 1 |
| }   video_object_layer_quant_type | 1 |
|   if(video_object_layer_quant_type){ | |
|     load_intra_quant_mat | 1 |
|     if(load_intra_quant_mat | |
|       intra_quant_mat[64] | 8*64 |
|     load_nonintra_quant_mat | 1 |
|     if(load_nonintra_quant_mat | |
|       nonintra_quant_mat[64] | 8*64 |
| } | |
| Error_resilient_dsable | 1 |
| Intra_acdc_pred_disable | 1 |
| videi_object_layer_fcode_forkward | 2 |
| videi_object_layer_fcode_backward | 2 |
| Separate_motion_shape_texture | 1 |
| if(video_object_layer_ssprite_usage== | |
|   STATIC_SPRITE) | |
|   sprite_shape_texture( ) | |

-continued

| Syntax | Nos. of bits | Mnemonic |
|---|---|---|
|     Scalability | 1 | |
|     if(scalability)( | | |
|         ref_layer_id | 4 | |
|         ref_layer_sampling_direc_ | 1 | |
|         hor_sampling_factor_n | 5 | |
|         hor_sampling_factor_m | 5 | |
|         vert_sampling_factor_n | 5 | |
|         vertor_sampling_factor_m | 5 | |
|         Enhancement_type | 1 | |
| } do{ | | |
|     videoObjectPlane( ) | | |
| }while(nextbits_bytealigned( )== | | |
|         video_object_plane_start_code) | | |
| next_start_code( ) | | |
| } | | |

VOL is discriminated by the number indicated by the identifier (video_object_layer_id). For example, VOL0, which is (video_object_layer_id=0), is a lower layer, whereas VOL1 which is (video_object_layer_id=1) is an upper layer. The number of scalable layers may be arbitrary.

The scalability is a 1-bit flag for specifying whether the VOL is the lower layer or the upper layer. If (scalability=1), its VOL is a lower layer and, if otherwise, the VOL is an upper layer.

The identifier (ref_layer_id) is a flag specifying the number of a reference picture VOL other than its own VOL used as a reference picture. This is transmitted for only the upper layer.

The identifiers (hor_sampling factor_n) and (hor_sampling factor_m) specify the number of times by which the horizontal length of the upper layer is longer than the horizontal length of the lower layer, that is the multiplication factor of the resolution in the horizontal direction. The size of the upper layer in the horizontal direction relative to the lower layer in the horizontal direction is represented by the following expression:

$$\text{hor\_sampling\_factor\_}n / \text{hor\_sampling\_factor\_}m$$

The identifiers (ver_sampling_factor_n) and (ver_sampling_factor_m) specify the number of times by which the vertical length of the upper layer is longer than the vertical length of the lower layer, that is the multiplication factor of the resolution in the vertical direction. The size of the upper layer in the vertical direction relative to the lower layer in the vertical direction is represented by the fallowing expression:

$$\text{ver\_sampling\_factor\_}n / \text{ver\_sampling\_factor\_}m$$

The following is the syntax of VOP (Video Object Plane Class):

| syntax | Nos. of bits | Mnemonic |
|---|---|---|
| VideoObjectPlane( ){ | | |
|     VOP_start_code | Sc +8 = 32 | |
|     do{ | | |
|         modulo_time_base | 1 | |
|     }while(modulo_time_base!="0") | | |
|     VOP_time_increment | 10 | |
|     VOP_prediction_type | 2 | |
|     If ((video_object_layer_ssprite_usage!= SPRITE_NOT_USED)££ | | |
|         (VOP_prediction_type==SPRITE)) { | | |
|         If (no_of_sprite_points > 0) { | | |
|             encode VOP_points ( ) | | |
|         } | | |
|         if (lighting_change_in_sprite) { | | |
|             lighting_change_factor_encode ( ) | | |
|         } | | |
|         if (video_object_layer_sprite_usage == STATIC_SPRITE) { | | |
|             return ( ) | | |
|         } | | |
|         else if (video_object_layer-sssprite_usage ==ON-LINE_SPRITE) { | | |
|             blending factor | 8 | |
|         } | | |
|     } | | |
|     if(video_object_layer_shape !="00") { | | |
|         VOP_width | 10 | |
|         VOP_height | 10 | |
|         VOP_vertical_mc_spatial_ref | 10 | |
|         Marker_bit | 1 | |

-continued

| syntax | Nos. of bits | Mnemonic |
|---|---|---|
|     VOP__vertical__mc__spatial__ref | 10 | |
|     If (scalability ££ enhancement type) | | |
|       Background__composition | 1 | |
| }<br>disable__sadct | | |
|     if (VOP__prediction__type=="10") | | |
|       VOP__dbquant | 2 | |
|     else | | |
|       VOP__quant | 5 | |
|     if ((video__object__layer__shape__effects=="0010")\|\| | | |
|       (video__object__layer__shape__effects=="0011")\|\| | | |
|       (video__object__layer__shape__effects=="0101")\|\| | | |
|     VOP__constant__alpha) | 1 | |
|     If (VOP__constant__alpha) | | |
|       VOP__constant__alpha__value | 8 | |
| } | | |
|     if (!scalability__motion__shape__texture) | | |
|      if (!separate__motion__shape__texture) | | |
|      if(error__resilience__disable) | | |
|       combined__motion__shape__texture__coding( ) | | |
|     else | | |
|      do{ | | |
|      do{ | | |
|       combined__motion__shape__texture__coding( ) | | |
|      } while (nextbits__bytealigned( ) !=0000 0000 0000 0000) | | |
|    If (nextbits__bytealigned( ) !=000 0000 0000 0000 0000 0000) { | | |
|       next__resync__marker ( ) | | |
|       resync__marker | 17 | |
|       macroblock__number | 1–12 | |
|       quant__scale | 5 | |
|     } while (nextbits__bytealigned( ) !=000 0000 0000 0000 0000 0000) | | |
|     else{ | | |
|     if(video__object__layer__shape !=xy)} | | |
|     do{ | | |
|       first__shape__code | 1–3 | |
|     } while (count of macroblocks ! = total number of macroblocks) | | |
|     } | | |
|     if(error__resilience__disable) | | |
|      { | | |
|      motion__coding ( ) | | |
|      if (video__object__layer__shape !="00") | | |
|     shape__coding ( ) | | |
|       texture__coding ( ) | | |
|     } | | |
|     else | | |
|      do{ | | |
|       do{ | | |
|        motion__coding( ) | | |
|      }while (next__bits( )! = "1010 0000 0000 0000 1" | | |
|      motion__marker | 17 | |
|      if (video__object__layer__shape !="00") | | |
|      shape__coding( ) | | |
|     do{ | | |
|      texture__coding( ) | | |
|     }while (nextbits__bytealigned ( )! = "0000 0000 0000 0000") | | |
|     if (nextbits__bytealigned( )! = "0000 0000 0000 0000 0000 0000){ | | |
|       next__resync__marker( ) | | |
|       resync__marker | 17 | |
|       macroblock__number | 1–12 | |
|       quant__scale | 5 | |
|     }while (nextbits__bytealigned( ) != 000 0000 0000 0000 0000 0000) | | |
|     } | | |
|    { | | |
|     else{ | | |
|     if(background__composition)( | | |
|     load__backward__shape | 1 | |
|       if(load__backward__shape){ | | |
|       backward__shape__coding( ) | | |
|       load__forward__shape) | 1 | |
|        forward__shape__coding( ) | | |

| syntax | Nos. of bits | Mnemonic |
|---|---|---|

```
        }
      }
    ref_seect_code
    if(VOP_prediction_type=="01"||VOP_prediction_type==
"10"){
        forward_temporal_ref                           10
        if(VOP_prediction_type=="10"){
        marker_bit                                      1
        backward_temporal_ref                          10
      }
    }
    combined_motion_shape_texture_codong( )
  }
next_state_ccode( )
}
``` the identifiers (VOP_width) and (VOP_height) are flags specifying the size of the VOP (VOP size).

An identifier (ref_select_code) is a flag specifying, based on an identifier (ref_layer_id), which layer picture is to be used as a reference picture in the forward prediction and in the backward prediction. The tables shown in FIGS. 10 and 11 show the details.

FIG. 16 shows the syntax of a macro-block in I- and P-pictures (picture VOP). (COD) is a flag specifying whether or not there is any data of a macro-block as from the flag. If (COD=1), there is no data of the macro-block as from this flag (skipping macro-block). If (COD=0), the flag is transmitted further. (MCBCP) is a flag specifying the type of the macro-block. It is in accordance with this flag that a pre-set flag and data are transmitted.

FIG. 17 shows the syntax of a macro-block in I- and P-pictures (picture VOP). If the corresponding macro-block of the latest decoded I- or P-picture (picture VOP) is a skip macro-block (COD=1), the macro-block in the B-picture (picture VOP) is also a skipping macro=block. (MODB) is a flag specifying the type of a macro-block in a B-picture (VOP). The variable length code of (MODB) is shown in FIG. 18. (MODB=0) specifies that there is no further macro-block data. If (MODB=10), it is not (CBPB) but (MBTYPE) that is transmitted. If (MODB=11), both (CBPB) and (MBTYPE) are transmitted. In the drawing, x denotes the current macro-block. (CBPB) is a 6-bit flag specifying whether or not there exist DCT coefficients in each block of a macro-block. If (CBPB) is not transmitted, (CBPB) is deemed to be 0 such that no DCT coefficients are transmitted for the macro-block. (MBTYPE) is a flag specifying the prediction mode of each macro-block in a B-picture. (MBTYPE) for the lower layer is shown in FIG. 19. The flag transmitted for a given macro-block is set, in accordance with (MBTYPE), as shown in FIG. 19. In the drawing, x denotes the current macro-block.

FIG. 20 shows (MBTYPE) in the upper layer. If (MBTYPE="1", the mode is the pixel-based prediction mode in which case no motion vector is transmitted.

The skipping macro-block condition in the lower layer is as follows:
(A) p-picture (VOP)
  (1) If COD=="1"
In this case, the macro-block is handled as a skipping macro-block. The DCT coefficients are all zero, while the motion vector is treated as being 0.
In case of a P-picture (VOP), the skipping macro-block condition is the same as that for the lower layer.

(B) B-picture (VOP)
  (1) If an associated macro-block of the latest decoded I- or P-picture (VOP) is a skipping macro-block (COD=1):
In this case, the macro-block is deemed to be a skipping macro-block. Prediction is as in the P-picture (VOP), with the motion vector being treated as 0.
  (2) If (1) does not hold and MODB=="0":
In this case, the macro-block is treated as a skipping macro-block. (MBTYPE) of this macro-block is direct (Direct(H.263)) and is encoded as in the PB pictures of H.263. At this.time, the motion vector of a macro-block at the same position in the directly previously decoded P-picture (VOP) is used as a motion vector.

The skipping macro-block condition for the upper layer (scalability=1) is as follows:
(A) P-picture (VOP)
  (1) If COD="1"
In this case, the macro-block is treated as a skipping macro-block. The DCT coefficients are all 0, while the motion vector is treated as being 0.
If the picture is a P-picture (VOP), the skipping macro-block condition is similar to that for the lower layer.
(B) picture (VOP)
In a skipping macro-block, the prediction mode or the reference picture should be set at the most commonly highly efficient mode. Therefore, in the upper layer macro-block in case of spatial scalability, the pixel-based prediction mode is efficient.

In the present embodiment, the skipping macro-block condition for the upper layer B-picture (VOP) is as follows:
(1) If ref_select_code=="00" and MODB=="0"
In case the identifier is (ref_select_code=="00"), data as from this identifier is transmitted at all times without dependency on the COD value, that is on whether or not the corresponding macro-block of the latest decoded I- or P-picture (VOP) is a skipping macro-block. It in this case the next-decoded (MODB) is 0, the macro-block is a skipping macro-block, such that data is not transmitted as from this identifier. At this time, prediction is the pixel-based prediction mode, with the motion vector being treated as 0.
(2) If ref_select_code!="00" and an associated macro-block of the latest decoded I- or P-picture (VOP) is a skipping macro-block (COD=1)
In this case, the macro-block is deemed to be a skipping macro-block. Prediction is carried put in the same way as in a P-picture (VOP), with the motion vector being treated as 0.
(3) If ref_select_code!="00" and MODB=="0"
In this case, the macro-block is treated as being a skipping macro-block, with (MBTYPE) of this macro-block being direct (H.263) such that the macro-block is encoded similarly to the PB pictures of H.263. At this time, the motion vector of a macro-block which is at the same position in the P-picture (VOP) decoded directly previously to the VOP specified by (ref_select_code) is used.

As may be seen form above, it is possible with the picture signal encoding method and apparatus, picture signal decoding method and apparatus and the recording medium of the present invention to improve both the prediction efficiency and the encoding efficiency.

What is claimed is:

1. A picture encoder for encoding picture signals of a lower hierarchy representing pre-set picture signals and picture signals of an upper hierarchy similarly representing pre-set picture signals, comprising:
   a first encoding unit for encoding the picture signals of the lower hierarchy using first reference pictures for outputting first pre-set encoded data;
   a second encoding unit for encoding the picture signals of the upper hierarchy using third reference pictures for outputting second pre-set encoded data;
   a first decoding unit for decoding said first encoded data for generating the first reference pictures;
   a second decoding unit for decoding said second encoded data for generating second reference pictures;
   differentiating means for determining a frame to frame difference value for pixels of the first reference pictures;
   comparing means for comparing the difference value and a predetermined threshold value on a pixel by pixel basis; and
   generating means for generating the third reference pictures by adaptively switching on a pixel by pixel basis between the first reference pictures and the second reference pictures based on a result of the comparing means, wherein for a given pixel position of the third reference picture, a value of a corresponding pixel in the first reference picture is used when the difference value is larger than the predetermined threshold value, and a value of a corresponding pixel in the second reference picture is used when the difference value is less than the predetermined threshold value.

2. The picture encoder as claimed in claim 1 wherein said second encoding unit selects the one of the first, second and third reference picture which minimize the prediction error from the picture signals of the upper hierarchy for encoding from block to block, said second encoding unit encoding the picture signals using the selected reference pictures.

3. The picture encoder as claimed in claim 1 wherein said third reference pictures are generated based on a value obtained on decoding the first encoded data on adaptively switching between the first reference pictures and the second reference pictures from pixel to pixel.

4. The picture encoder as claimed in claim 3 wherein the value obtained on decoding the first encoded data is a difference value between the picture signals of the lower hierarchy and prediction pictures used for encoding the picture signals of the lower hierarchy.

5. The picture encoder as claimed in claim 4 wherein, if a resolution of the picture signals of the upper hierarchy is higher than that of the lower hierarchy, third prediction pictures are generated based on selecting pixels of second prediction pictures or pixels of the third prediction pictures in case said difference value is not more than a pre-set threshold value or if said difference value exceeds said pre-set threshold value.

6. The picture encoder as claimed in claim 1 wherein a resolution of the upper hierarchy picture signals is higher than that of the lower hierarchy picture signals.

7. The picture encoder as claimed in claim 6 wherein said first reference pictures are pictures matched to the resolution of the upper hierarchy picture signals by resolution converting the pictures obtained on decoding said first encoded data.

8. The picture encoder as claimed in claim 2 further comprising:
   a transmitting unit for transmitting flag information specifying the selected reference pictures and the first and second encoded data.

9. The picture encoder as claimed in claim 3 wherein, if the picture signals of the upper and lower hierarchies are encoded from block to block, and if block data of the lower hierarchy picture signals corresponding to a pre-set block of the upper hierarchy picture signals adapted for encoding is transmitted, said first reference pictures are selected.

10. The picture encoder as claimed in claim 3 wherein said first reference pictures are concurrent lower hierarchy picture signals and wherein said second reference pictures are picture signals of the same hierarchy as that of the upper hierarchy picture signals adapted for encoding.

11. A picture encoding method for encoding picture signals of a lower hierarchy representing pre-set picture signals and picture signals of an upper hierarchy similarly representing pre-set picture signals, comprising:
   a first encoding step of encoding the picture signals of the lower hierarchy using first reference pictures for outputting first encoded data;
   a second encoding step of encoding the picture signals of the upper hierarchy using third reference pictures for outputting second encoded data;
   a first decoding step of decoding said first encoded data for generating the first reference pictures;
   a second decoding step of decoding said second encoded data for generating second reference pictures;
   a differentiating step for determining a frame to frame difference value of the first reference pictures;
   a comparing step for comparing the difference value and a predetermined threshold value on a pixel by pixel basis; and
   a generating step of generating the third reference pictures by adaptively switching on a pixel by pixel basis between the first reference pictures and the second reference pictures based on a result of the comparing step, wherein for a given pixel position of the third reference picture, a value of a corresponding pixel in the first reference picture is used when the difference value is larger than the predetermined threshold value, and a value of a corresponding pixel in the second reference picture is used when the difference value is less than the predetermined threshold value.

12. The picture encoding method as claimed in claim 11 wherein said second encoding step selects the one of the first, second and third reference pictures minimizing the prediction error from the picture signals of the upper hierarchy for encoding from block to block and encodes the picture signals using the selected reference pictures.

13. The picture encoding method as claimed in claim 11 wherein said third reference pictures are generated based on a value obtained on decoding the first encoded data on adaptively switching between the first reference pictures and the second reference pictures from pixel to pixel.

14. The picture encoding method as claimed in claim 13 wherein the value obtained on decoding the first encoded data is a difference value between the picture signals of the lower hierarchy and prediction pictures used for encoding the picture signals of the lower hierarchy.

15. The picture encoding method as claimed in claim 14 wherein, if a resolution of the picture signals of the upper hierarchy is higher than that of the lower hierarchy, third prediction pictures are generated based on selecting pixels of second prediction pictures or pixels of the third prediction pictures in case said difference value is not more than a pre-set threshold value or if said difference value exceeds said pre-set threshold value, respectively.

16. The picture encoding method as claimed in claim 11 wherein a resolution of the upper hierarchy picture signals is higher than that of the lower hierarchy picture signals.

17. The picture encoding method as claimed in claim 16 wherein said first reference pictures are picture signals matched to the resolution of the upper layer picture signals by resolution-converting the pictures obtained on decoding said first encoded data.

18. The picture encoding method as claimed in claim 12 further comprising:
    a transmitting step for transmitting flag information specifying the selected reference pictures and the first and second encoded data.

19. The picture encoding method as claimed in claim 13 wherein, if the picture signals of the upper and lower hierarchies are encoded from block to block, and if block data of the lower hierarchy picture signals corresponding to a pre-set block of the upper hierarchy picture signals adapted for encoding is transmitted, said first reference pictures are selected.

20. The picture encoding method as claimed in claim 13 wherein said first reference pictures are concurrent lower hierarchy picture signals and wherein said second reference picture signals are picture signals of the same hierarchy as that of the upper hierarchy picture signals adapted for encoding.

21. A picture decoding device for receiving and decoding encoded data composed of encoded picture signals of a lower hierarchy and encoded picture signals of an upper hierarchy, said encoded picture signals of the lower hierarchy and said encoded picture signals of the upper hierarchy being signals encoded using respective reference pictures, comprising:
    a receiving unit for receiving said encoded data;
    a first decoding unit for decoding the encoded picture signals of the lower hierarchy using first reference pictures for outputting decoded picture signals of the lower hierarchy, with the decoded picture signals of the lower hierarchy being used as the first reference pictures;
    a second decoding unit for decoding the encoded picture signals of the upper hierarchy using third reference pictures for outputting decoded picture signals of the upper hierarchy, with the decoded picture signals of the upper hierarchy being used as second reference pictures;
    differentiating means for determining a frame to frame difference value of the first reference pictures;
    comparing means for comparing the difference value and a predetermined threshold value on a pixel by pixel basis; and
    generating means for generating the third reference pictures by adaptively switching on a pixel by pixel basis between the first reference pictures and the second reference pictures based on a result of the comparing means, wherein for a given pixel position of the third reference picture, a value of a corresponding pixel in the first reference picture is used when the difference value is larger than the predetermined threshold value, and a value of a corresponding pixel in the second reference picture is used when the difference value is less than the predetermined threshold value.

22. The picture decoding device as claimed in claim 21 wherein said encoded data contains flag information and wherein said flag information specifies, on a block basis, one of the first to third reference pictures which are used for decoding the upper layer hierarchy picture signals.

23. The picture decoding device as claimed in claim 21 wherein said third reference pictures are generated based on a value obtained on decoding the first encoded data on adaptively switching between the first reference pictures and the second reference pictures from pixel to pixel.

24. The picture decoding device as claimed in claim 23 wherein the value obtained on decoding the first encoded data is a difference value between the picture signals of the lower hierarchy and prediction pictures used for encoding the picture signals of the lower hierarchy.

25. The picture decoding device as claimed in claim 24 wherein, if a resolution of the picture signals of the upper hierarchy is higher than that of the lower hierarchy, third prediction pictures are generated based on selecting pixels of second prediction pictures or pixels of the third prediction pictures in case said difference value is not more than a pre-set threshold value or if said difference value exceeds said pre-set threshold value, respectively.

26. The picture decoding device as claimed in claim 21 wherein a resolution of the upper hierarchy picture signals is higher than that of the lower hierarchy picture signals.

27. The picture decoding device as claimed in claim 26 wherein said first reference pictures are picture signals matched to the resolution of the upper layer picture signals by resolution-converting the pictures obtained on decoding said first encoded data.

28. The picture decoding device as claimed in claim 26 wherein, if the upper hierarchy picture signals and the lower hierarchy picture signals are encoded on a block basis, and if block data of the lower hierarchy picture signals corresponding to a pre-set block of the upper hierarchy picture signals adapted for encoding is transmitted, said first reference pictures are selected.

29. The picture decoding device as claimed in claim 22 wherein said first reference pictures are the lower hierarchy picture signals concurrent with the upper hierarchy picture signals adapted for encoding and wherein said second reference pictures are picture signals of the same hierarchy as that of the upper hierarchy picture signals adapted for encoding.

30. A picture decoding method for receiving and decoding encoded data composed of encoded picture signals of a lower hierarchy and encoded picture signals of an upper hierarchy, said encoded picture signals of the lower hierarchy and said encoded picture signals of the upper hierarchy being signals encoded using respective reference pictures, comprising:
    a receiving step for receiving said encoded data;
    a first decoding step of decoding the encoded picture signals of the lower hierarchy using first reference pictures for outputting decoded picture signals of the lower hierarchy, with the decoded picture signals of the lower hierarchy being used as first reference pictures;
    a second decoding step of decoding the encoded picture signals of the upper hierarchy using third reference pictures for outputting decoded picture signals of the upper hierarchy, with the decoded picture signals of the upper hierarchy being used as second reference pictures; and a differentiating step for determining a frame to frame difference value of the first reference pictures;

a comparing step for comparing the difference value and a predetermined threshold value on a pixel by pixel basis; and a generating step of generating the third reference pictures by adaptively switching on a pixel by pixel basis between the first reference pictures and the second reference pictures based on a result of the comparing step, wherein for a given pixel position of the third reference picture, a value of a corresponding pixel in the first reference picture is used when the difference value is larger than the predetermined threshold value, and a value of a corresponding pixel in the second reference picture is used when the difference value is less than the predetermined threshold value.

31. The picture decoding method as claimed in claim 30 wherein said encoded data contains flag information and wherein said flag information specifies, on a block basis, one of the first to third reference pictures which are used for decoding the upper hierarchy picture signals;

said second decoding step decoding the picture signals using the reference pictures specified by said flag.

32. The picture decoding method as claimed in claim 30 wherein said third reference pictures are generated based on a value obtained on decoding the first encoded data on adaptively switching between the first reference pictures and the second reference pictures from pixel to pixel.

33. The picture decoding method as claimed in claim 32 wherein the value obtained on decoding the first encoded data is a difference value between the picture signals of the lower hierarchy and prediction pictures used for encoding the picture signals of the lower hierarchy.

34. The picture decoding method as claimed in claim 33 wherein, if a resolution of the picture signals of the upper hierarchy is higher than that of the lower hierarchy, third prediction pictures are generated based on selecting pixels of second prediction pictures or pixels of the third prediction pictures in case said difference value is not more than a pre-set threshold value or if said difference value exceeds said pre-set threshold value, respectively.

35. The picture decoding method as claimed in claim 30 wherein a resolution of the upper hierarchy picture signals is higher than that of the lower hierarchy picture signals.

36. The picture decoding method as claimed in claim 35 wherein said first reference pictures are picture signals matched to the resolution of the upper hierarchy picture signals by resolution-converting pictures obtained on decoding said lower hierarchy picture signals.

37. The picture decoding method as claimed in claim 31 wherein, if the upper hierarchy picture signals and the lower hierarchy picture signals are encoded on a block basis, and if block data of the lower hierarchy picture signals corresponding to a pre-set block of the upper hierarchy picture signals adapted for encoding is transmitted, said first reference pictures are selected.

38. The picture decoding method as claimed in claim 31 wherein said first reference pictures are the lower hierarchy picture signals concurrent with the upper hierarchy picture signals adapted for encoding and wherein said second reference pictures are picture signals of the same hierarchy as that of the upper hierarchy picture signals adapted for encoding.

39. A recording medium decodable by a picture decoding device, said recording medium containing encoded data composed of encoded picture signals of a lower hierarchy and encoded picture signals of an upper hierarchy, said encoded data being data generated by:

a first encoding step of encoding the picture signals of the lower hierarchy using first reference pictures for outputting first encoded data;

a second encoding step of encoding the picture signals of the upper hierarchy using third reference pictures for outputting second encoded data;

a first decoding step of decoding said first encoded data for generating the first reference pictures;

a second decoding step of decoding said second encoded data for generating second reference pictures;

a differentiating step of determining a frame to frame difference value of the first reference pictures;

a comparing step of comparing the difference value and a predetermined threshold value on a pixel by pixel basis; and a generating step of generating the third reference pictures by adaptively switching on a pixel by pixel basis between the first reference pictures and the second reference pictures based on a result of the comparing step, wherein for a given pixel position of the third reference picture, a value of a corresponding pixel in the first reference picture is used when the difference value is larger than the predetermined threshold value, and a value of a corresponding pixel in the second reference picture is used when the difference value is less than the predetermined threshold value.

40. The recording medium as claimed in claim 39 wherein said encoded data contains flag information and wherein said flag information specifies, on a block basis, one of the first to third reference picture signals which are used for decoding the upper layer hierarchy picture signals.

* * * * *